US012686121B2

(12) United States Patent
Oda et al.

(10) Patent No.: US 12,686,121 B2
(45) Date of Patent: Jul. 21, 2026

(54) ROBOT SYSTEM, LEARNING APPARATUS, INFORMATION PROCESSING APPARATUS, LEARNED MODEL, CONTROL METHOD, INFORMATION PROCESSING METHOD, METHOD FOR MANUFACTURING PRODUCT, AND RECORDING MEDIUM

(71) Applicant: CANON KABUSHIKI KAISHA, Tokyo (JP)

(72) Inventors: Akihiro Oda, Kanagawa (JP); Kazuhiko Shinagawa, Tokyo (JP); Yuichiro Kudo, Kanagawa (JP); Motohiro Horiuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 18/489,713

(22) Filed: Oct. 18, 2023

(65) Prior Publication Data

US 2024/0131699 A1 Apr. 25, 2024
US 2024/0227180 A9 Jul. 11, 2024

(30) Foreign Application Priority Data

Oct. 21, 2022 (JP) ................................ 2022-168949
Sep. 5, 2023 (JP) ................................ 2023-143833

(51) Int. Cl.
  *B25J 9/16* (2006.01)
  *B25J 13/08* (2006.01)
(52) U.S. Cl.
  CPC ............... *B25J 9/163* (2013.01); *B25J 13/08* (2013.01)

(58) Field of Classification Search
  CPC . B25J 9/163; B25J 13/08; B25J 9/1664; B25J 13/085; G05B 19/423; G05B 2219/39532; G05B 2219/40391; G05B 2219/40571; G05B 2219/40606
  See application file for complete search history.

(56) References Cited

U.S. PATENT DOCUMENTS

| | | | | |
|---|---|---|---|---|
| 9,321,176 B1* | 4/2016 | Sun | ...................... | B25J 15/0028 |
| 2016/0059412 A1* | 3/2016 | Oleynik | ................ | G05B 19/42 |
| | | | | 700/250 |
| 2016/0257000 A1* | 9/2016 | Guerin | ................... | B25J 9/1671 |
| 2017/0246745 A1* | 8/2017 | Kobayashi | ............. | B25J 9/1612 |
| 2017/0249561 A1* | 8/2017 | Abdallah | ............... | B25J 9/0081 |
| 2019/0358824 A1* | 11/2019 | Takeuchi | ................ | B25J 9/161 |
| 2020/0198128 A1* | 6/2020 | Hatanaka | ........... | G05B 23/0272 |

(Continued)

FOREIGN PATENT DOCUMENTS

| | | |
|---|---|---|
| JP | 2018205929 A | 12/2018 |
| JP | 6583537 B2 | 10/2019 |

(Continued)

*Primary Examiner* — Adam R Mott
*Assistant Examiner* — Sagar KC
(74) *Attorney, Agent, or Firm* — Canon U.S.A., Inc. IP Division

(57) ABSTRACT

A robot system includes a robot, and an information processing portion. The information processing portion is configured to obtain a learned model by learning first force information about a force applied by a worker to a workpiece, first position information about a position of a first portion of the worker, and first workpiece information about a state of the workpiece, and control the robot on a basis of output data of the learned model.

32 Claims, 27 Drawing Sheets

(56)　　　　　　　References Cited

U.S. PATENT DOCUMENTS

| | | | | |
|---|---|---|---|---|
| 2021/0122045 A1* | 4/2021 | Handa | .................... | B25J 13/084 |
| 2021/0402593 A1* | 12/2021 | Wake | .................... | G06V 40/28 |
| 2022/0161427 A1* | 5/2022 | Yerazunis | ............. | B25J 9/1674 |
| 2022/0161444 A1* | 5/2022 | Yerazunis | ................ | B25J 9/104 |
| 2023/0173660 A1* | 6/2023 | Wang | .................... | B25J 9/1697 |
| | | | | 700/262 |
| 2023/0339111 A1* | 10/2023 | Hamaya | ................... | B25J 9/163 |
| 2024/0109181 A1* | 4/2024 | Wang | ............... | G06F 18/24147 |

FOREIGN PATENT DOCUMENTS

| | | | |
|---|---|---|---|
| JP | 2020104216 A | 7/2020 |
| JP | 2020110894 A | 7/2020 |
| JP | 2020196097 A | 12/2020 |

* cited by examiner

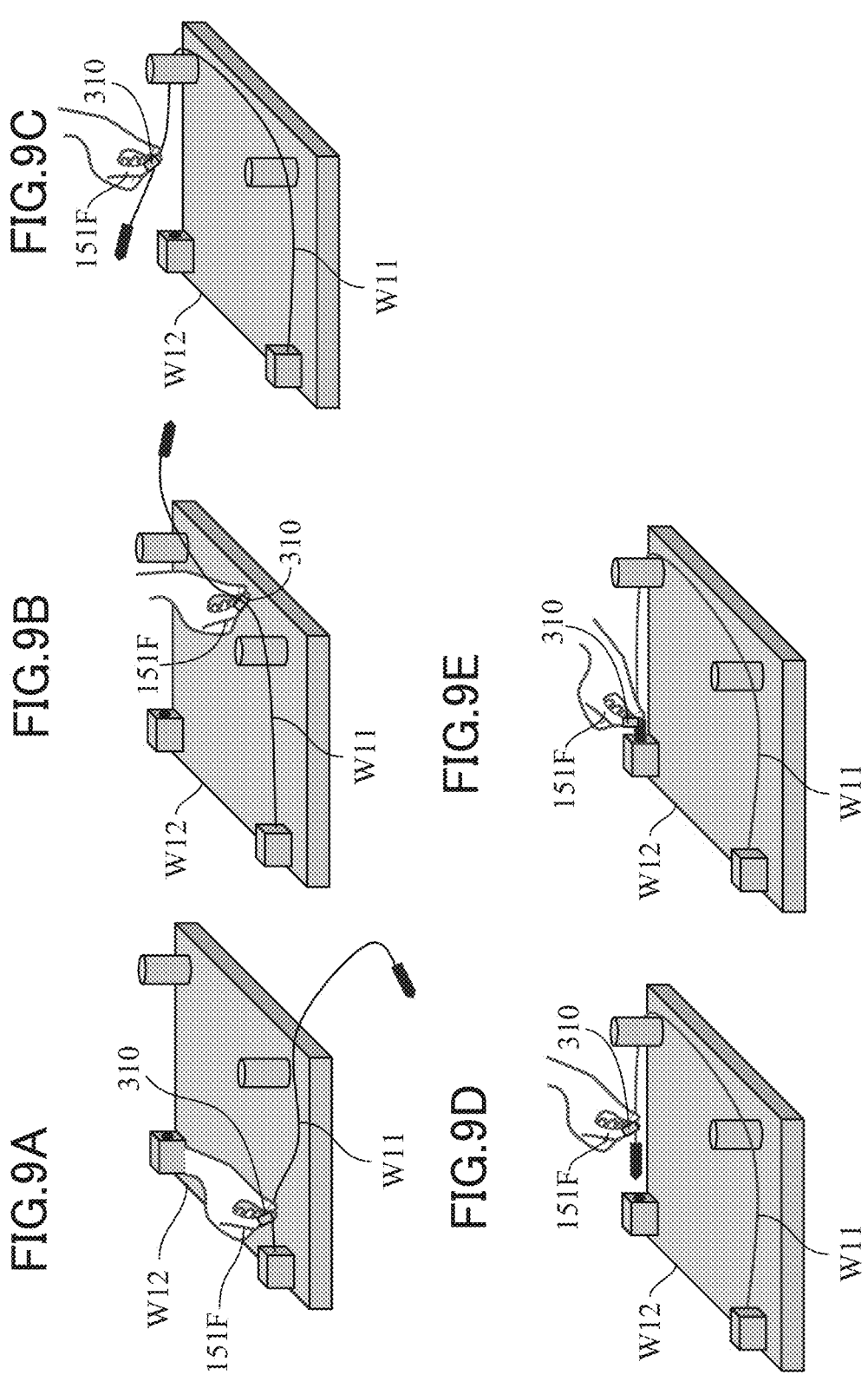

| Time | Position Information | | | | | | Force Information | | | | | | Workpiece Information |
|---|---|---|---|---|---|---|---|---|---|---|---|---|---|
| t | x[m] | y[m] | z[m] | a[deg.] | b[deg.] | c[deg.] | Fx[N] | Fy[N] | Fz[N] | Mx[Nm] | My[Nm] | Mz[Nm] | Image |
| 0 | 100 | 100 | 50 | 180 | 30 | 0 | 0 | 0 | 5 | 0 | 5 | 0 | |
| 1 | 100 | 100 | 50 | 180 | 30 | 0 | 0 | 0 | 10 | 0 | 5 | 0 | |
| . | . | . | . | . | . | . | . | . | . | . | . | . | |
| . k . | . | . | . | . | . | . | . | . | . | . | . | . | |
| . | . | . | . | . | . | . | . | . | . | . | . | . | |
| m | 150 | 200 | 50 | 180 | 60 | 180 | 0 | 0 | 10 | 5 | 0 | 5 | |

D20

| Time | Position Information | | | | | | Force Information | | | | | | Workpiece Information |
|---|---|---|---|---|---|---|---|---|---|---|---|---|---|
| t | x[m] | y[m] | z[m] | a[deg.] | b[deg.] | c[deg.] | Fx[N] | Fy[N] | Fz[N] | Mx[Nm] | My[Nm] | Mz[Nm] | Image |
| 0 | 100 | 100 | 50 | 180 | 30 | 0 | 0 | 0 | 5 | 0 | 5 | 0 |  |

FIG.26

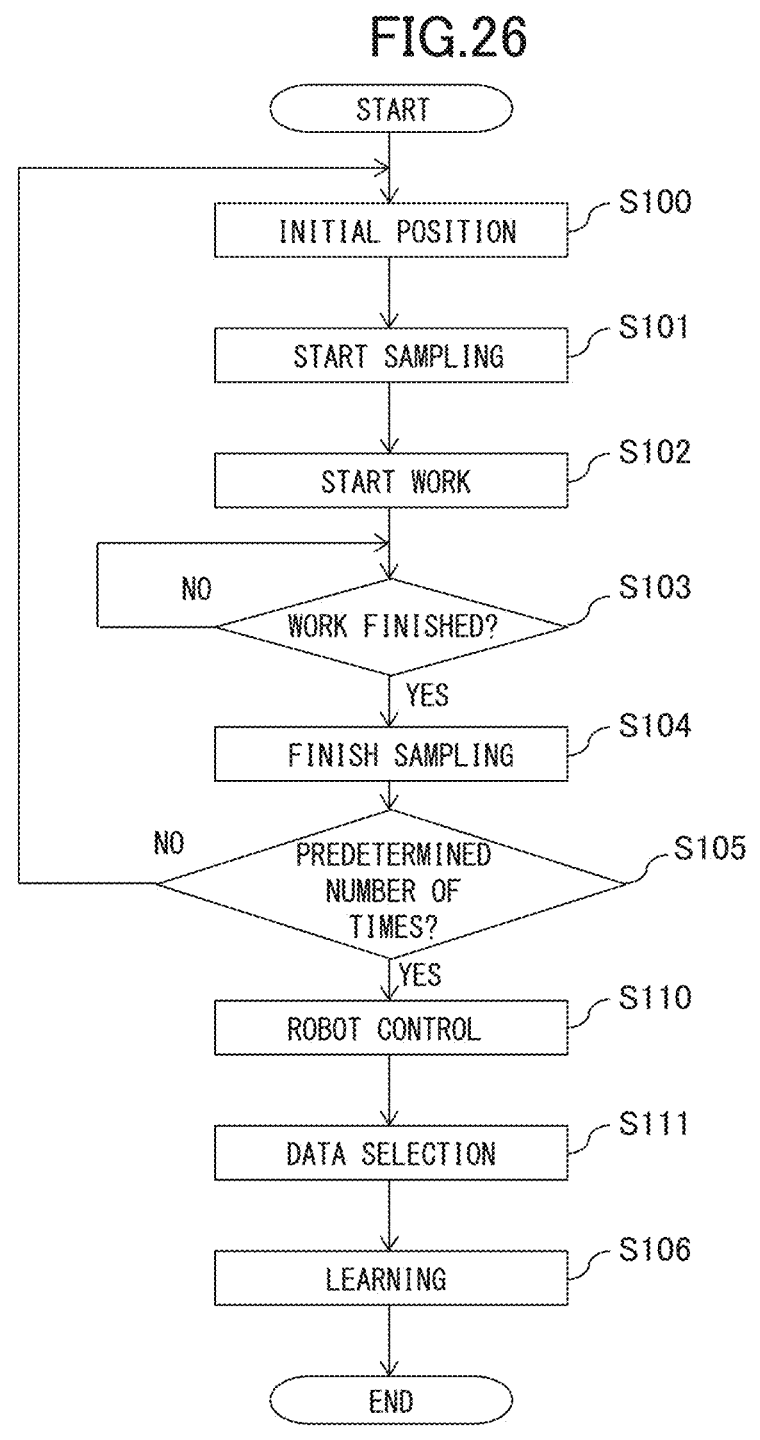

```
        ( START )
           │
     ┌─────┼◄──────────────────────┐
     │     ▼                        │
     │  ┌──────────────────┐        │
     │  │ INITIAL POSITION │──── S100│
     │  └──────────────────┘        │
     │     │                        │
     │     ▼                        │
     │  ┌──────────────────┐        │
     │  │  START SAMPLING  │──── S101│
     │  └──────────────────┘        │
     │     │                        │
     │     ▼                        │
     │  ┌──────────────────┐        │
     │  │    START WORK    │──── S102│
     │  └──────────────────┘        │
     │     │                        │
     │     ▼                        │
     │   NO ◄─── WORK FINISHED? ── S103
     │              │ YES           │
     │              ▼               │
     │  ┌──────────────────┐        │
     │  │ FINISH SAMPLING  │──── S104│
     │  └──────────────────┘        │
     │              │               │
     │   NO    PREDETERMINED        │
     └─── NUMBER OF ──── S105       │
            TIMES?                  │
              │ YES                 │
              ▼                     │
     ┌──────────────────┐           │
     │  ROBOT CONTROL   │──── S110   │
     └──────────────────┘           │
              │                     │
              ▼                     │
     ┌──────────────────┐           │
     │  DATA SELECTION  │──── S111   │
     └──────────────────┘           │
              │                     │
              ▼                     │
     ┌──────────────────┐           │
     │     LEARNING     │──── S106   │
     └──────────────────┘           │
              │                     │
              ▼                     │
            ( END )
```

ROBOT SYSTEM, LEARNING APPARATUS, INFORMATION PROCESSING APPARATUS, LEARNED MODEL, CONTROL METHOD, INFORMATION PROCESSING METHOD, METHOD FOR MANUFACTURING PRODUCT, AND RECORDING MEDIUM

BACKGROUND

Field

The present disclosure relates to robot technology.

Description of the Related Art

Conventionally, when starting an automated manufacture system including devices such as robot manipulators in a factory, a worker having a specialized knowledge to some extent is needed, and even if there is such a worker, a lot of workload is required for setting the devices.

As an example of easily performing such a work, Japanese Patent Laid-Open No. 2020-110894 discloses a system that generates, by using machine learning, a learned model assuming various operation environments.

SUMMARY

According to a first aspect of the present disclosure, a robot system includes a robot, and an information processing portion. The information processing portion is configured to obtain a learned model by learning first force information about a force applied by a worker to a workpiece, first position information about a position of a first portion of the worker, and first workpiece information about a state of the workpiece, and control the robot on a basis of output data of the learned model.

According to a second aspect of the present disclosure, a learning apparatus includes a learning portion configured to obtain a learned model by learning first force information about a force applied by a worker to a workpiece, first position information about a position of a first portion of the worker, and first workpiece information about a state of the workpiece.

According to a third aspect of the present disclosure, an information processing apparatus includes an information processing portion configured to obtain a learned model by learning first force information about a force applied by a worker to a workpiece, first position information about a position of a first portion of the worker, and first workpiece information about a state of the workpiece.

According to a fourth aspect of the present disclosure, a learned model is obtained by machine learning based on first force information about a force applied by a worker to a workpiece, first position information about a position of a first portion of the worker, and first workpiece information about a state of the workpiece.

According to a fifth aspect of the present disclosure, a control method includes obtaining a learned model by learning first force information about a force applied by a worker to a workpiece, first position information about a position of a first portion of the worker, and first workpiece information about a state of the workpiece, and controlling a robot on a basis of output data of the learned model.

According to a sixth aspect of the present disclosure, an information processing method includes obtaining a learned model by learning first force information about a force applied by a worker to a workpiece, first position information about a position of a first portion of the worker, and first workpiece information about a state of the workpiece.

Further features of the present invention will become apparent from the following description of exemplary embodiments with reference to the attached drawings.

BRIEF DESCRIPTION OF THE DRAWINGS

FIG. 9A is an explanatory diagram illustrating an example of an assembly work by the worker according to the embodiment.

FIG. 9B is an explanatory diagram illustrating an example of the assembly work by the worker according to the embodiment.

FIG. 9C is an explanatory diagram illustrating an example of the assembly work by the worker according to the embodiment.

FIG. 9D is an explanatory diagram illustrating an example of the assembly work by the worker according to the embodiment.

FIG. 9E is an explanatory diagram illustrating an example of the assembly work by the worker according to the embodiment.

FIG. 11 is an explanatory diagram illustrating an example of time-series data according to the embodiment.

FIG. 26 is a flowchart for obtaining a learned model of a tenth modification example of the embodiment.

DESCRIPTION OF THE EMBODIMENTS

In the system disclosed in Japanese Patent Laid-Open No. 2020-110894, a worker operates a robot manipulator, and causes a computer to learn the motion of the robot manipulator. In the case of operating a robot manipulator and causing the robot manipulator to grip a workpiece and perform a work to obtain data to be used for learning as described above, the operation performed by the robot manipulator is likely to be awkward. As a result, the operation of the robot manipulator performed on the basis of the output data of the obtained learned model is also likely to be awkward, which leads to low efficiency of work by the robot manipulator.

An aspect of the present disclosure is to improve the work efficiency of a robot.

An exemplary embodiment of the present disclosure will be described in detail below with reference to drawings. In the description below, a robot manipulator will be simply referred to as a robot.

Summary of System

Figure 1:
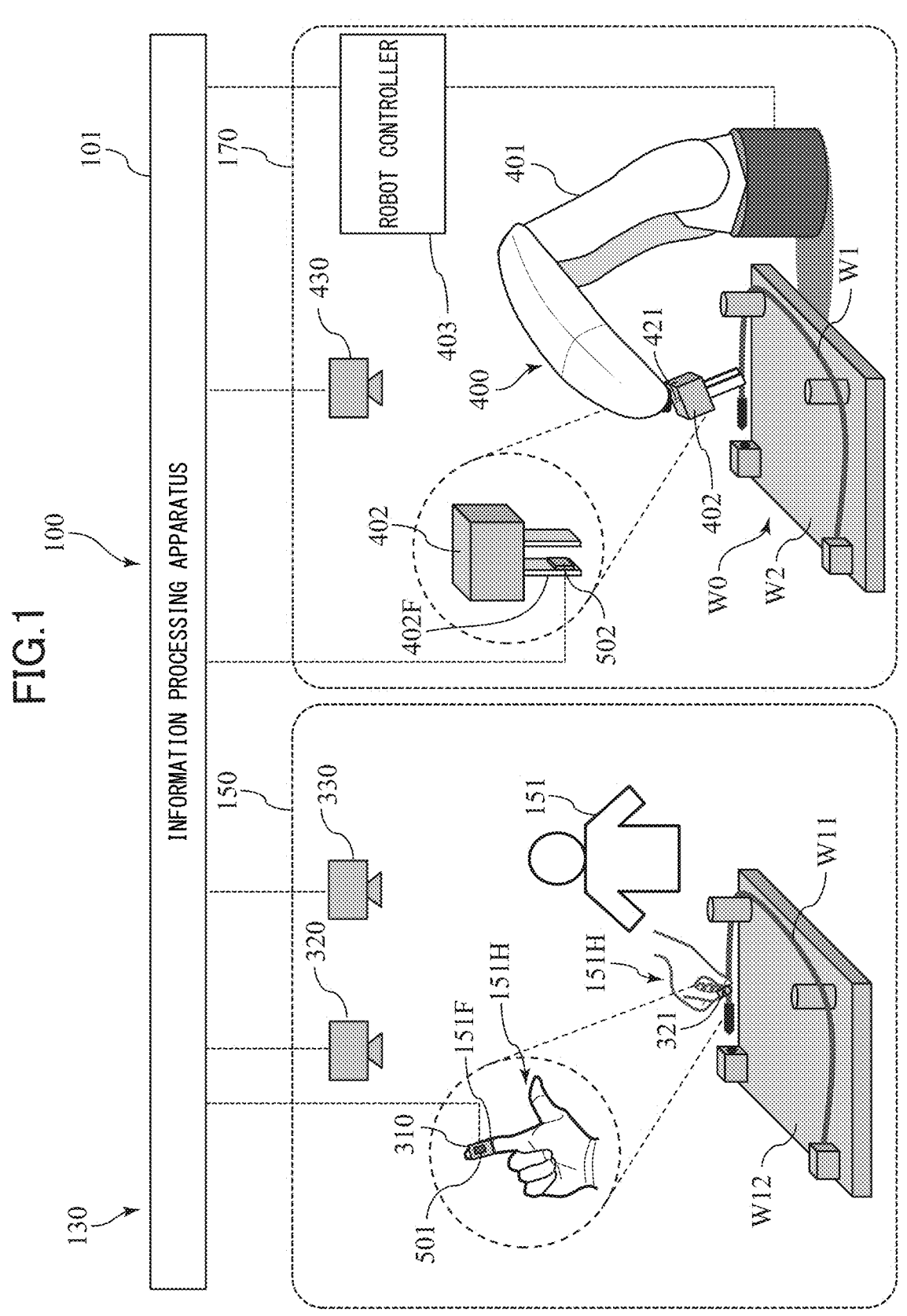
FIG. 1 is an explanatory diagram illustrating a schematic configuration of a robot system according to an embodiment.

FIG. 1 is an explanatory diagram illustrating a schematic configuration of a robot system 100 according to the embodiment. In the present embodiment, a product W0 is manufactured by coupling a workpiece W1 to a workpiece W2 by the robot system 100. To be noted, in FIG. 1, a state before the workpiece W1 is coupled to the workpiece W2 is illustrated, and the product W0 including the workpieces W1 and W2 is manufactured by coupling the workpiece W1 to the workpiece W2. The product W0 to be manufactured may be an intermediate product, or a final product. The workpiece W1 is a deformable member, a flexible member, or a warpable member. In the present embodiment, the workpiece W1 is a warpable linear member, for example, a wire such as a wire harness. The workpiece W2 is a base member. A root end of the workpiece W1 is connected to the workpiece W2. The product W0 is manufactured by connecting the distal end of the workpiece W1 to a connector of the workpiece W2. The product W0 is, for example, an electronic device or a unit included in the electronic device.

The robot system 100 includes a learning apparatus 130 including an information processing apparatus 101 and a learning unit 150, and an automated manufacture unit 170. The learning unit 150 and the information processing apparatus 101 are used for machine learning, and the automated manufacture unit 170 is used for manufacturing the product W0. The information processing apparatus 101 is constituted by a computer. The machine learning of the present embodiment is supervised learning. The learning unit 150 is used for generating teacher data.

The learning unit 150 includes a tool 310, a force sensor 501, a camera 320, and a camera 330. The cameras 320 and 330 and the force sensor 501 are connected to the information processing apparatus 101. The information processing apparatus 101 can obtain image information and force information from the cameras 320 and 330 and the force sensor 501.

The tool 310, the force sensor 501, and the cameras 320 and 330 are used for the information processing apparatus 101 to obtain teacher data. In the learning unit 150, workpieces W11 and W12 are used when the information processing apparatus 101 generates teacher data. The workpiece W11 is a workpiece having a configuration that is the same or similar to the configuration of the workpiece W1. The workpiece W12 is a workpiece having a configuration that is the same or similar to the configuration of the workpiece W2. The root end of the workpiece W11 is connected to the workpiece W12. An assembled product is manufactured by connecting the distal end of the workpiece W11 to a connector of the workpiece W12. That is, the workpieces W11 and W12 are used for imitating an operation of a worker 151 manufacturing a product.

The tool 310 is held by the worker 151, and is used for the worker 151 to grip the workpiece W11. That is, the tool 310 is a tool used for gripping the workpiece W11. In the present embodiment, the tool 310 is a wearable tool that can be worn on a finger 151F of the worker 151. The worker 151 wears the tool 310 on, among a plurality of fingers, the finger 151F that is used when performing a predetermined work, and performs the predetermined work.

The force sensor 501 is attached to the tool 310. The force sensor 501 is an example of a first force sensor. The force sensor 501 outputs a signal corresponding to a force acting thereon to the information processing apparatus 101. The force acting on the force sensor 501 is also a force acting on the tool 310. Therefore, the information processing apparatus 101 can obtain, from the force sensor 501, force information about the force acting on the tool 310 worn on the finger 151F. To be noted, since the tool 310 is a wearable tool worn on the finger 151F, the force acting on the force sensor 501 is also a force acting on the finger 151F. In addition, the force acting on the tool 310 is also a gripping force of the worker 151, that is, a hand 151H gripping the workpiece W11. That is, the force sensor 501 can detect the force of the worker 151 gripping the workpiece W11.

The camera 320 is an example of a first image pickup apparatus. The camera 330 is an example of a second image pickup apparatus. The cameras 320 and 330 are each a digital camera. The cameras 320 and 330 are each disposed at a position where the workpieces W11 and W12 and the hand 151H of the worker 151 are within the field angle thereof.

The automated manufacture unit 170 includes a robot 400, a robot controller 403, a camera 430, and a force sensor 502. The robot 400 is an industrial robot, and is disposed in a manufacture line. The robot 400 and the robot controller 403 are mutually communicably connected to each other. The robot controller 403 and the information processing apparatus 101 are mutually communicably connected to each other. The camera 430 and the force sensor 502 are connected to the information processing apparatus 101. The information processing apparatus 101 is capable of obtaining image information and force information from the camera 430 and the force sensor 502.

The robot 400 includes a robot arm 401, and a robot hand 402 serving as an example of an end effector. The robot arm 401 is a vertically articulated robot arm. The robot hand 402 is supported by the robot arm 401. The robot hand 402 is attached to a predetermined portion of the robot arm 401, for example, a distal end portion of the robot arm 401.

The robot hand 402 is configured to be capable of gripping the workpiece W1. The robot hand 402 includes a robot finger 402F. A force sensor 502 is attached to the robot finger 402F of the robot hand 402. The force sensor 502 is an example of a second force sensor. The force sensor 502 outputs a signal corresponding to the force acting thereon to the information processing apparatus 101. As a result of this, the information processing apparatus 101 can obtain information about a force acting on the robot finger 402F of the robot hand 402 from the force sensor 502. To be noted, the force acting on the force sensor 502 is also the force acting on the robot finger 402F. In addition, the force acting on the robot finger 402F is also a gripping force of the robot 400, that is, the robot hand 402 gripping the workpiece W1. That is, the force sensor 502 is capable of detecting the strength of the force of the robot 400 gripping the workpiece W1.

The camera 430 is an example of a third image pickup apparatus. The camera 430 is a digital camera. The camera 430 is disposed at a position where the workpieces W1 and W2 and the robot hand 402 are within the field angle thereof.

Figure 2:
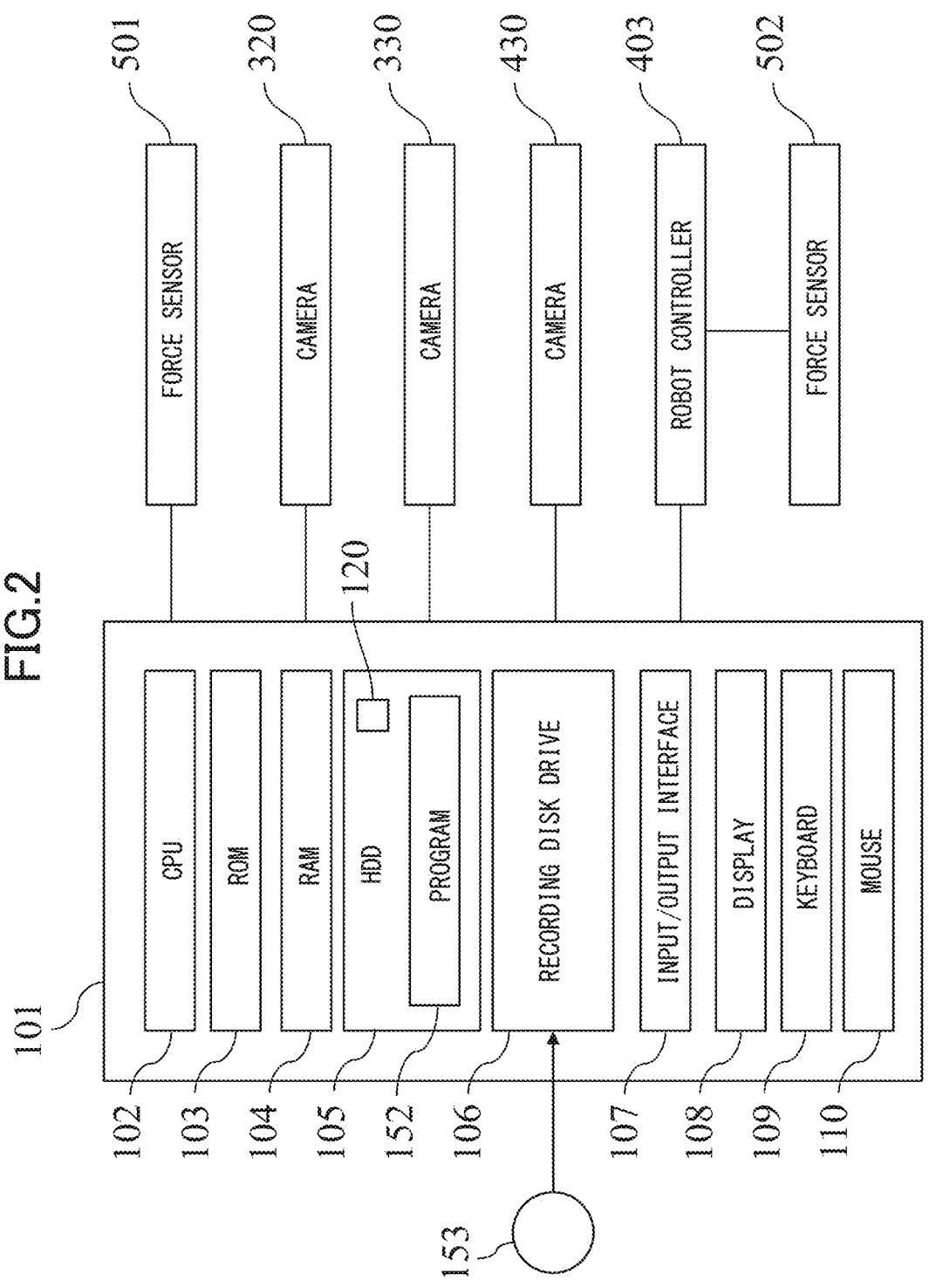
FIG. 2 is a block diagram illustrating an information processing apparatus according to the embodiment and devices connected to the information processing apparatus.

Next, a configuration of the information processing apparatus 101 will be described. FIG. 2 is a block diagram illustrating the information processing apparatus 101 according to the embodiment, and devices connected to the information processing apparatus 101.

The information processing apparatus 101 includes a central processing unit: CPU 102 serving as an example of a processor. The CPU 102 functions as a learning portion that will be described later. In addition, the information processing apparatus 101 includes a read-only memory: ROM 103, a random access memory: RAM 104, and a hard disk drive: HDD 105. In addition, the information processing apparatus 101 includes a recording disk drive 106, an input/output interface 107, a display 108 serving as an example of a display portion, and a keyboard 109 and a mouse 110 serving as an example of an input portion. The CPU 102, the ROM 103, the RAM 104, the HDD 105, the recording disk drive 106, the input/output interface 107, the display 108, the keyboard 109, and the mouse 110 are mutually communicably interconnected via a bus.

The ROM 103 stores a basic program related to the operation of the computer. The RAM 104 temporarily stores various data such as arithmetic processing results of the CPU 102. The HDD 105 stores the arithmetic processing results of the CPU 102, various data obtained from the outside, and the like, and stores a program 152 for executing various processing that will be described later. The program 152 is application software that enables the CPU 102 to execute various processing that will be described later. Therefore, the CPU 102 can execute various processing that will be described later by executing the program 152 stored in the HDD 105. In addition, the HDD 105 includes an area storing a learned model 120 obtained from execution results of various processing that will be described later. The recording disk drive 106 can read out various data, programs, and the like stored in a recording disk 153.

In addition, the force sensor 501, the camera 320, the camera 330, the camera 430, and the robot controller 403 are connected to the information processing apparatus 101. The force sensor 502 is connected to the robot controller 403. To be noted, the force sensor 502 may be connected to the information processing apparatus 101. The CPU 102 can obtain force information from the force sensors 501 and 502, obtain image information that is a captured image from the cameras 320, 330, and 430, and store these pieces of information in the HDD 105.

To be noted, although the HDD 105 is a computer-readable non-transitory recording medium and the program 152 is stored in the HDD 105 in the present embodiment, the configuration is not limited to this. The program 152 may be stored in any recording medium as long as the recording medium is a computer-readable non-transitory recording medium. Examples of the recording media for supplying the program 152 to the computer include flexible disks, hard disks, optical disks, magneto-photo disks, magnetic tapes, and non-volatile memories.

Figure 3:
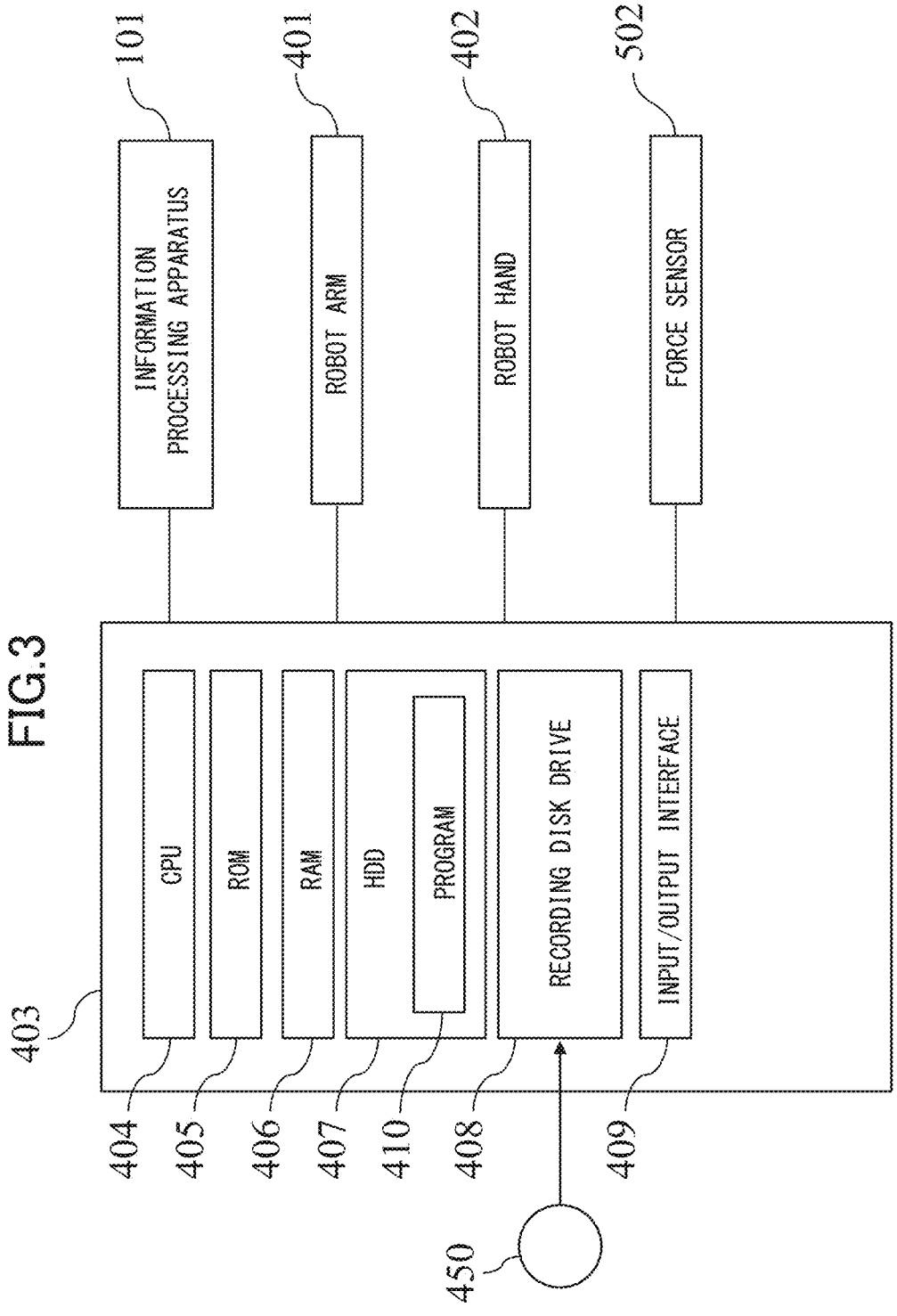
FIG. 3 is a block diagram illustrating a robot controller according to the embodiment and devices connected to the robot controller.

Next, the configuration of the robot controller 403 will be described. FIG. 3 is a block diagram illustrating the robot controller 403 according to the embodiment and devices connected to the robot controller 403.

The robot controller 403 includes a CPU 404 serving as an example of a processor. The CPU 404 functions as a controller. In addition, the robot controller 403 includes a ROM 405, a RAM 406, and an HDD 407 as storage portions. In addition, the robot controller 403 includes a recording disk drive 408, and an input/output interface 409. The CPU 404, the ROM 405, the RAM 406, the HDD 407, the recording disk drive 408, and the input/output interface 409 are mutually communicably interconnected via a bus.

The ROM 405 stores a basic program related to the operation of the computer. The RAM 406 temporarily stores various data such as the arithmetic processing results of the CPU 404. The HDD 407 stores the arithmetic processing results of the CPU 404, various data obtained from the outside, and the like, and stores a program 410 for causing the CPU 404 to execute various processing that will be described later.

The program 410 is application software that enables the CPU 404 to execute various processing that will be described later. Therefore, the CPU 404 can execute control processing by executing the program 410 stored in the HDD 407, and thus control the operation of the robot 400. The recording disk drive 408 can read out various data, programs, and the like stored in a recording disk 450.

In addition, the information processing apparatus 101, the robot arm 401, the robot hand 402, and the force sensor 502 are connected to the robot controller 403. The CPU 404 of the robot controller 403 transfers the force information obtained from the force sensor 502 to the information processing apparatus 101. As a result of this, the CPU 102 of the information processing apparatus 101 can obtain force information from the force sensor 502.

To be noted, although the HDD 407 is a computer-readable non-transitory recording medium and the program 410 is stored in the HDD 407 in the present embodiment, the configuration is not limited to this. The program 410 may be stored in any recording medium as long as the recording medium is a computer-readable non-transitory recording medium. Examples of the recording media for supplying the program 410 to the computer include flexible disks, hard disks, optical disks, magneto-photo disks, magnetic tapes, and non-volatile memories.

In addition, the robot controller 403 or the information processing apparatus 101 may be connected to a network. In addition, the camera 320, 330, or 430 and the information processing apparatus 101, the information processing apparatus 101 and the robot controller 403, or the robot controller 403 and the robot 400 may be interconnected via a network.

Figure 4:
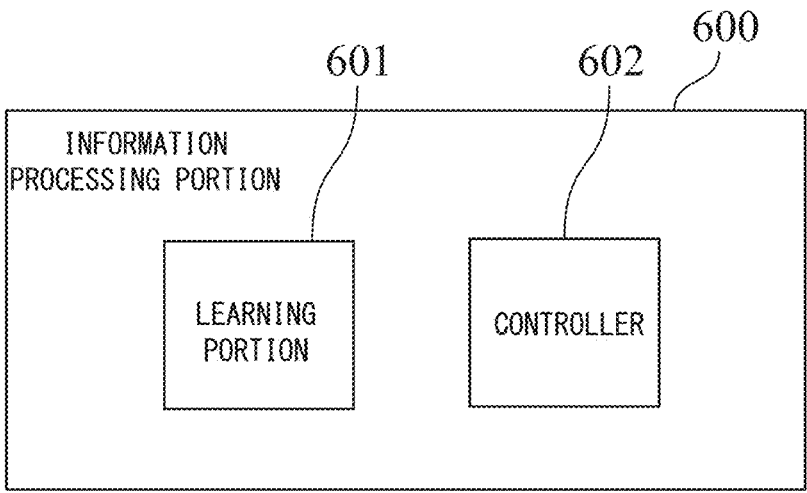
FIG. 4 is a functional block diagram of processing performed by a CPU according to the embodiment.

FIG. 4 is a functional block diagram of processing by the CPUs 102 and 404 according to the embodiment. The CPU 102 executes the program 152, and thus functions as a learning portion 601 that performs various information processing related to machine learning, the information processing including image processing, learning processing, and inference processing. In addition, the CPU 404 executes the program 410, and thus functions as a controller 602 that executes various control processing related to robot control. The CPUs 102 and 404 execute the programs 152 and 410, and thus function as an information processing portion 600 including the learning portion 601 and the controller 602.

To be noted, although image processing, learning processing, inference processing, and control processing are distributed to and executed by a plurality of computers, that is, a plurality of CPUs in the present embodiment, the configuration is not limited to this. The image processing, learning processing, inference processing, and control processing may be concentrated to and executed by one computer, that is, one CPU. In this case, one computer, that is, one CPU may be configured to function as the learning portion 601 and the controller 602. In addition, in the case where the image processing, learning processing, inference processing, and control processing are distributed to and executed by a plurality of CPUs, one of the image processing, learning processing, inference processing, and control processing may be distributed to and executed by two or more CPUs included in the plurality of CPUs. For example, most part of the control processing may be executed by the CPU 404, and part of the control processing may be executed by the CPU 102.

The worker 151 demonstrates a predetermined work by using the learning unit 150. The learning portion 601 records the details of the work in a storage device (recording device) such as the HDD 105, and performs learning processing on the basis of the recorded work details. In addition, the learning portion 601 performs inference processing on input data that has been input, and outputs output data that is a result of the inference to the controller 602. The controller 602 controls the robot 400 on the basis of the output data obtained by the inference processing by the learning portion 601, and causes the robot 400 to perform the predetermined work.

A workpiece set including the workpieces W1 and W2 before assembly is conveyed to the vicinity of the robot 400 by an unillustrated conveyance apparatus such as a conveyor. In the workpiece set including the workpieces W1 and W2 before assembly, the distal end of the workpiece W1 is not coupled to the workpiece W2. The predetermined work performed by the robot 400 in the present embodiment is a work of drawing the workpiece W1 on a predetermined path on the workpiece W2, and coupling the distal end of the workpiece W1 to a predetermined portion of the workpiece W2, for example, a connector. In the description below, this work will be referred to as an assembly work.

In the present embodiment, the product W0 is manufactured by performing the assembly work. The product W0 manufactured by the assembly work is discharged from the vicinity of the robot 400, and a next set of workpieces including the workpieces W1 and W2 before assembly is conveyed thereto.

Meanwhile, in the learning process, a workpiece set including the workpieces W11 and W12 is used. The learning portion 601 obtains force information about the force acting on the tool 310 from the force sensor 501 at a predetermined sampling rate from the start to the end of the assembly work by the worker 151. At the same time, the learning portion 601 obtains a captured image at a predetermined sampling rate from each of the cameras 320 and 330. That is, the learning portion 601 obtains these pieces of information at a predetermined sampling rate in a synchronized manner.

Here, the finger 151F of the worker 151 or the tool 310 includes a feature portion. The learning portion 601 obtains position information about a position of the feature portion included in the finger 151F of the worker 151 or the tool 310 by performing image processing on the captured image obtained from the camera 320.

The workpiece W11 is captured in the captured image obtained from the camera 330. The workpiece W11 is a linear member, and is warped to various states. That is, the learning portion 601 obtains a captured image from the camera 330 as information about the state of the workpiece W11.

The learning portion 601 performs machine learning by learning processing using these pieces of information as teacher data, and then obtains, by inference processing, data used when the robot 400 is controlled by the controller 602.

As described above, the robot system 100 of the present embodiment has a learning phase in which machine learning is performed, and an inference phase in which inference is performed and the robot 400 is operated on the basis of the inference result. First, the configuration of the learning unit 150 used in the learning phase, and the processing by the learning portion 601 will be described in detail.

Learning

The worker 151 can cause the learning portion 601 to learn about the details of the work to be performed by the robot 400, by using the learning unit 150.

First, the worker 151 demonstrates an assembly work that is to be reproduced by the robot 400. When the worker 151 demonstrates the assembly work, the learning portion 601 obtains information about the motion of the worker 151, and information about the strength of the force that the worker 151 applies to the workpiece W11, by using the force sensor 501 that obtains information about the force acting on the tool 310, the camera 320 that images the hand 151H of the worker 151 and the tool 310, and the camera 330 that images the workpiece W11.

The force sensor 501 disposed in the tool 310 is preferably configured in accordance with the details of work such that information about the strength of force that is to be reproduced by the robot 400 can be obtained.

Figure 5A:
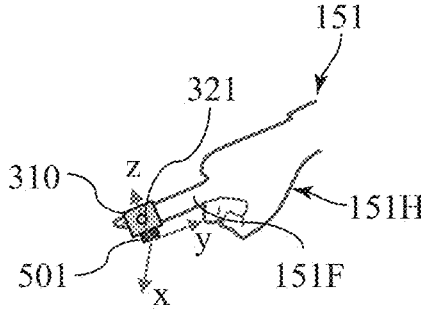
FIG. 5A is an explanatory diagram illustrating a state in which a tool is worn by a worker according to the embodiment.

FIG. 5A is an explanatory diagram illustrating a state in which the tool 310 is worn on the finger 151F of the hand 151H of the worker 151. The tool 310 is a wearable tool having a ring shape, and is detachably worn on the finger 151F. In the tool 310, the force sensor 501 is disposed at a portion that touches the workpiece W11 during work. The force sensor 501 is preferably capable of detecting force in three-axis directions and moments about the three axes acting on a contact point where the force sensor 501 can contact an object such as the workpiece W11. That is, the force sensor 501 preferably outputs six pieces of force information. The three axes are axes that are orthogonal to each other. One of the three axes is vertical at the contact point, and the other two are axes horizontal at the contact point.

One or a plurality of force sensors 501 may be provided. In the case where the learning unit 150 includes a plurality of force sensors 501, the plurality of force sensors 501 are preferably arranged in an array shape. In addition, the force sensor 501 may be of any type such as an electric resistance type including a strain gauge, an electrostatic capacitance type that obtains a change amount of the electrostatic capacitance that changes in accordance with the force, a piezoelectric type including a piezoelectric element, or an optical type that optically reads the deformation amount of an elastic member that deforms in accordance with the force. That is, it suffices as long as the force sensor 501 can detect the force and moment acting on the contact point of the tool 310 from the start to the end of the work by the worker 151.

Figure 5B:
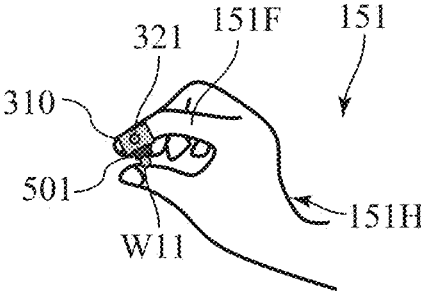
FIG. 5B is an explanatory diagram illustrating a state in which the worker according to the embodiment is gripping a workpiece.

FIG. 5B is an explanatory diagram illustrating a state in which the worker 151 is gripping the workpiece W11.

Figure 5C:
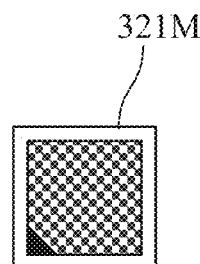
FIG. 5C is an explanatory diagram of a marker given to the tool according to the embodiment.

FIG. 5C is an explanatory diagram of a marker 321M for tracking applied to the tool 310. The worker 151 performs the assembly work in a state in which the workpiece W11 is gripped by the finger 151F and another finger among the plurality of fingers. At this time, the worker 151 grips the workpiece W11 such that the force sensor 501 comes into contact with the workpiece W11.

A gripping force or a shearing force acts on the force sensor 501 when the worker 151 grips the workpiece W11 and performs the assembly work. That is, while the worker 151 is drawing the workpiece W11, the worker 151 slides the workpiece W11 between the finger 151F and the other finger, grips the workpiece W11 so as not to slide, draws the workpiece W11 while deforming the workpiece W11, or draws the workpiece W11 while applying a force to the workpiece W11. As a result of these operations, a gripping force or a shearing force acts on the force sensor 501. The force sensor 501 can detect the force that the worker 151 applies consciously or unconsciously in the case of drawing the workpiece W11, and output force information that is a detection result thereof to the learning portion 601.

Figures 6A, 6B:
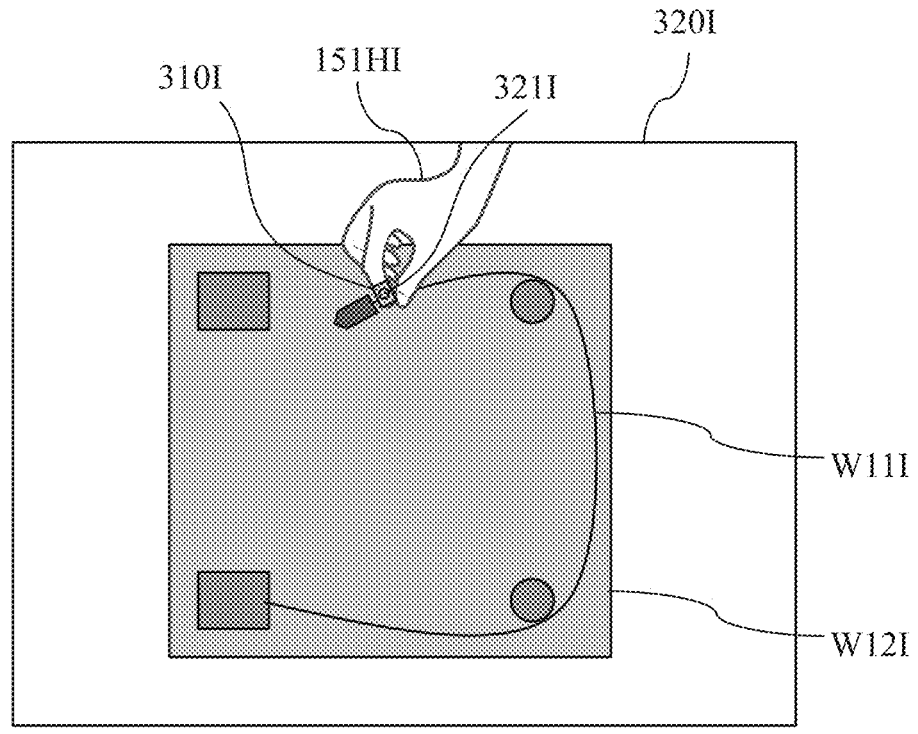
FIG. 6A is an explanatory diagram of a captured image obtained from a first image pickup apparatus according to the embodiment.
FIG. 6B is an explanatory diagram of a captured image obtained from a second image pickup according to the embodiment.

FIG. 6A is an explanatory diagram of a captured image 320I obtained from the camera 320 according to the embodiment. The captured image 320I is an example of a first image. The camera 320 images objects including the workpieces W11 and W12, the worker 151, and the tool 310, and thus the captured image 320I used for obtaining position information of a feature portion 321 included in the worker 151 or the tool 310 can be obtained. The feature portion 321 is an example of a first portion.

The captured image 320I includes a workpiece image W11I that is a portion corresponding to the workpiece W11, a workpiece image W12I that is a portion corresponding to the workpiece W12, a hand image 151HI that is a portion corresponding to the hand 151H of the worker 151, and a tool image 310I that is a portion corresponding to the tool 310. The learning portion 601 can obtain the position information of the feature portion 321 from the captured image 320I by image processing. The feature portion 321 is better to be closer to the finger 151F used for the work, and is preferably included in the finger 151F or the tool 310. In the present embodiment, the feature portion 321 is included in the tool 310. The feature portion 321 may be a portion of the tool 310 different from or the same as a portion where the force sensor 501 is disposed.

The feature portion 321 is a portion that can be extracted from the captured image 320I by image processing by the learning portion 601. The learning portion 601 can obtain the position of the feature portion 321 by performing image processing on the captured image 320I. The feature portion 321 preferably has a marker 321M for tracking illustrated in FIG. 5C so as to be easily extracted by image processing.

The camera 320 may be disposed anywhere as long as the camera 320 can generate the captured image 320I with which the position information of the feature portion 321 can be obtained. In addition, the learning unit 150 may include a plurality of cameras 320 as long as the learning unit 150 includes one or more cameras 320. For example, in the case where the feature portion 321 of the tool 310 includes a part that is blocked from the sight, a plurality of cameras 320 may be prepared in advance. In addition, the camera 320 may be a two-dimensional camera, or a camera capable of three-dimensional measurement.

As described above, the learning portion 601 obtains the position information of the feature portion 321 from the captured image 320I obtained from the camera 320. To be noted, the learning portion 601 may obtain the position information of the feature portion 321 by using a measurement device. At this time, the measurement device may be disposed at a position where the position of the feature portion 321 can be measured. In addition, for example, an acceleration sensor and an encoder that measures the movement amount from a standard position may be used in combination, and the position of the feature portion 321 may be calculated by the learning portion 601 on the basis of measurement results of these.

FIG. 6B is an explanatory diagram of a captured image 330I obtained from the camera 330 according to the embodiment. The captured image 330I is an example of a second image. By imaging the objects including the workpieces W11 and W12, the hand 151H of the worker 151, and the tool 310, the captured image 330I is obtained. The captured image 330I includes the workpiece image W11I that is a portion corresponding to the workpiece W11, the workpiece image W12I that is a portion corresponding to the workpiece W12, the hand image 151HI that is a portion corresponding to the hand 151H of the worker 151, and the tool image 310I that is a portion corresponding to the tool 310. The learning portion 601 obtains workpiece information about the state of the workpiece W11 from the captured image 330I. The workpiece information about the state of the workpiece W11 is image information included in the captured image 330I, that is, the workpiece image W11I. The camera 330 may be a camera capable of two-dimensional position measurement or a camera capable of three-dimensional position measurement as long as the camera 330 is capable of generating an image with which workpiece information about the state of the workpiece W11 during the work can be obtained. In the present embodiment, workpiece information about the state of the workpiece W12 is also obtained from the captured image 330I. That is, in the case where a plurality of workpieces serve as targets of the predetermined work, workpiece information about the state of the plurality of workpieces is obtained from the captured image 330I.

In addition, for example, if the workpiece information is obtained while tracking the position of the feature portion 321, the camera 320 or the camera 330, for example, the camera 330 can be omitted. In this case, the position of the feature portion 321 is obtained from the captured image 320I obtained from the camera 320, and workpiece information about the state of the workpiece W11 is obtained from the captured image 320I. As described above, in the present embodiment, information about the state of the workpiece W11 includes information about the deformation of the workpiece W11 that changes in time series in accordance with the operation by the worker 151.

Figure 7A:
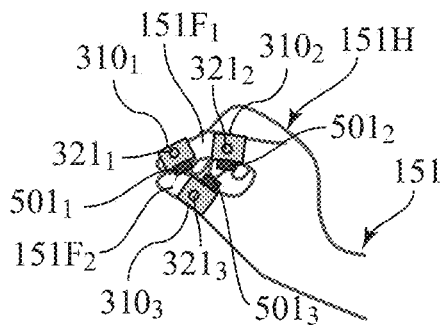
FIG. 7A is an explanatory diagram illustrating tools according to a first modification example of the embodiment.

FIG. 7A is an explanatory diagram illustrating a tool according to a first modification example of the embodiment. The learning unit 150 may include a plurality of sets of the tool 310 and the force sensor 501. Tools $310_1$, $310_2$, and $310_3$ illustrated in FIG. 7A each have substantially the same configuration as the tool 310 described above, and is a wearable tool that can be worn on a finger of the worker 151. For example, the tools $310_1$ and $310_2$ are worn on a finger $151F_1$ of the hand 151H, and the tool $310_3$ is worn on a finger 151F 3 of the hand 151H.

The tool $310_1$ is provided with a force sensor $501_1$, the tool $310_2$ is provided with a force sensor $501_2$, and the tool $310_3$ is provided with a force sensor $501_3$. The force sensors $501_1$, $501_2$, and $501_3$ each have substantially the same configuration as the force sensor 501 described above. the tool $310_1$ includes a feature portion $321_1$, the tool $310_2$ includes a feature portion $321_2$, and the tool $310_3$ includes a feature portion $321_3$. The feature portions $321_1$, $321_2$, and $321_3$ each have substantially the same configuration as the feature portion 321 described above.

As described above, in the case where there are a plurality of sets of the tool 310 and the force sensor 501, the learning portion 601 obtains the position information of each of the feature portions $321_1$ to $321_3$ from a captured image obtained from the camera 320. In addition, the learning portion 601 obtains force information from each of the force sensors $501_1$ to $501_3$. As described above, sets of the tool 310 and the force sensor 501 can be freely added in accordance with the work that is to be reproduced by the robot 400.

Figure 7B:
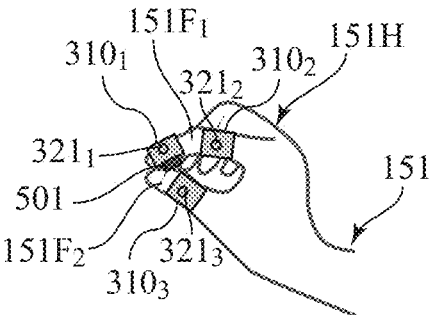
FIG. 7B is an explanatory diagram illustrating tools according to a second modification example of the embodiment.

FIG. 7B is an explanatory diagram illustrating a tool according to a second modification example of the embodiment. The learning unit 150 may include at least one force sensor 501 and a plurality of tools 310. The number of the tools 310 is larger than the number of the force sensors 501. The tools $310_1$, $310_2$, and $310_3$ of the second modification example illustrated in FIG. 7B are configured as described in the first modification example.

The tool $310_1$ is provided with the force sensor 501. In contrast, neither of the tool $310_2$ and the tool $310_3$ is provided with the force sensor 501. That is, the tools $310_2$ and $310_3$ are used for obtaining the position information of the feature portion $321_2$ and the position information of the feature portion $321_3$, and do not contribute to acquisition of the force information. As described above, the plurality of tools 310 used for acquisition of the position information may include a tool 310 not provided with a force sensor 501. That is, a tool 310 provided with a force sensor 501 and a tool 310 not provided with a force sensor 501 may be used in combination in accordance with the work that is to be reproduced by the robot 400.

To be noted, in both the first modification example illustrated in FIG. 7A and the second modification example illustrated in FIG. 7B, the robot hand 402 needs to include a joint mechanism and a link mechanism that are movable in accordance with a plurality of pieces of position information.

Figure 7C:
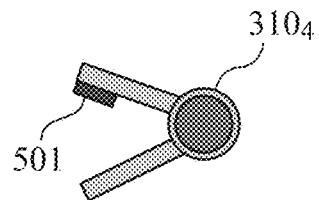
FIG. 7C is an explanatory diagram illustrating a tool according to a third modification example of the embodiment.

FIG. 7C is an explanatory diagram illustrating a tool according to a third modification example of the embodiment. The learning unit 150 includes a tool $310_4$ and the force sensor 501. The tool $310_4$ has a configuration different from that of the tool 310. The tool $310_4$ is a tool held by the worker 151, and is used for gripping the workpiece W11. That is, the tool $310_4$ is a tool used for gripping the workpiece W11. The tool $310_4$ is a hand mechanism that can be operated by the hand 151H of the worker 151. The tool $310_4$ that is a hand mechanism includes a plurality of links and one joint. The worker 151 can operate a plurality of links of the tool $310_4$ to cause the tool $310_4$ to grip the workpiece W11. The force sensor 501 is provided at a portion that can come into contact with the workpiece W11. To be noted, a plurality of force sensors 501 may be provided in the tool $310_4$ in accordance with the work. The tool $310_4$ may be operated by the worker 151, and the worker 151 can operate the tool $310_4$ to cause the tool $310_4$ to grip the workpiece W11. When the tool $310_4$ grips the workpiece W11, the gripping force thereof is transmitted to the worker 151 via the tool $310_4$. That is, the worker 151 can receive, via the tool $310_4$, the feel of the tool $310_4$ gripping the workpiece W11.

Figure 7D:
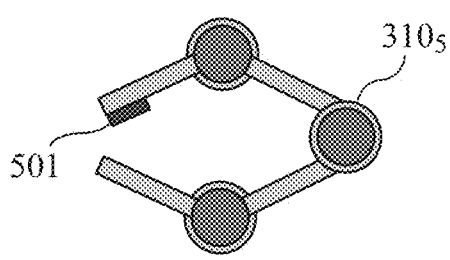
FIG. 7D is an explanatory diagram illustrating a tool according to a fourth modification example of the embodiment.

FIG. 7D is an explanatory diagram illustrating a tool according to a fourth modification example of the embodiment. The learning unit 150 includes a tool $310_5$ and a force sensor 501. The tool $310_5$ is different from the tool $310_4$ of FIG. 7C in the number of the joints and the number of the links. The tool $310_5$ is a tool held by the worker 151, and is used for gripping the workpiece W11. That is, the tool $310_5$ is a tool used for gripping the workpiece W11. The tool $310_5$ is a hand mechanism that can be operated by the hand 151H of the worker 151. The tool $310_5$ that is a hand mechanism includes a plurality of links and a plurality of joints. The worker 151 can operate the plurality of links of the tool $310_5$ to cause the tool $310_5$ to grip the workpiece W11. The force sensor 501 is provided at a position in a link where the force sensor 501 can come into contact with the workpiece W11. To be noted, a plurality of force sensors 501 may be provided in the tool $310_5$ in accordance with the work. The worker 151 just needs to operate the tool $310_5$, and the worker 151 can operate the tool $310_5$ to cause the tool $310_5$ to grip the workpiece W11. When the tool $310_5$ grips the workpiece W11, the gripping force thereof is transmitted to the worker 151 via the tool $310_5$. That is, the worker 151 can receive, via the tool $310_5$, the feel of the tool $310_5$ gripping the workpiece W11.

A hand mechanism such as the tool $310_4$ of the third modification example or the tool $310_5$ of the fourth modification example preferably has a shape imitating the robot hand 402 used in the robot 400, that is, a shape close to that of the robot hand 402.

Figure 8:
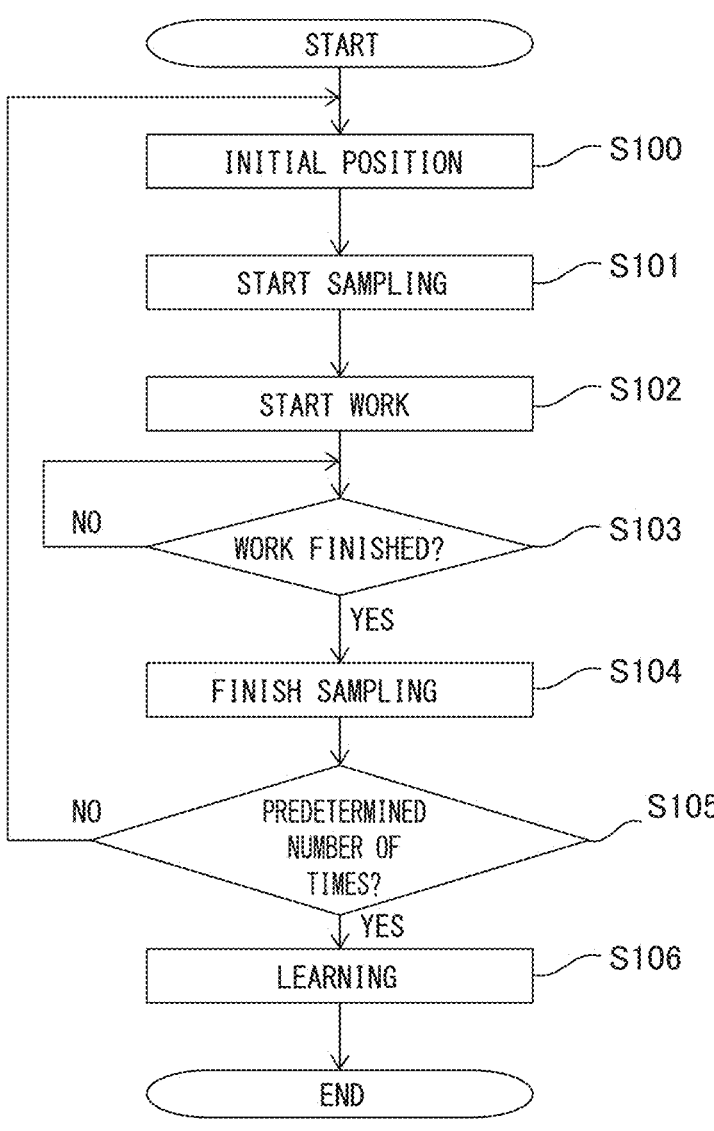
FIG. 8 is a flowchart for obtaining a learned model according to the embodiment.

According to the above configuration, the worker 151 can demonstrate the work to be reproduced by the robot 400 by using the learning unit 150, and thus the learning portion 601 can obtain the teacher data. The learned model 120 illustrated in FIG. 2 is obtained by the learning portion 601 in accordance with the flowchart illustrated in FIG. 8. FIG. 8 is a flowchart for obtaining the learned model 120 according to the embodiment. A machine learning program used for the learning portion 601 to obtain the learned model 120 is included in the program 152 stored in the HDD 105 of the information processing apparatus 101 illustrated in FIG. 2. FIGS. 9A to 9E are explanatory diagrams illustrating an example of an assembly work by the worker 151 according to the embodiment.

In step S100, the worker 151 grips the workpiece W11 at an initial position of the work as illustrated in FIG. 9A. For example, the worker 151 grips a portion near the root end of the workpiece W11.

Next, in step S101, the worker 151 causes the learning portion 601 to start sampling of the information from the force sensor 501 and the cameras 320 and 330. The sampling of information is performed at a predetermined sampling rate in a synchronized manner between the force sensor 501 and the cameras 320 and 330.

The worker 151 starts the assembly work at a state of FIG. 9A, and performs the assembly work as illustrated in FIGS. 9B to 9E. In the case where the worker 151 has not finished the assembly work, that is, in the case where the result of step S103 is NO, the assembly work is continued. In the case where the worker 151 has finished the assembly work, that is, in the case where the result of step S103 is YES, the worker 151 causes the learning portion 601 to finish the sampling of information in step S104.

Figure 10A:
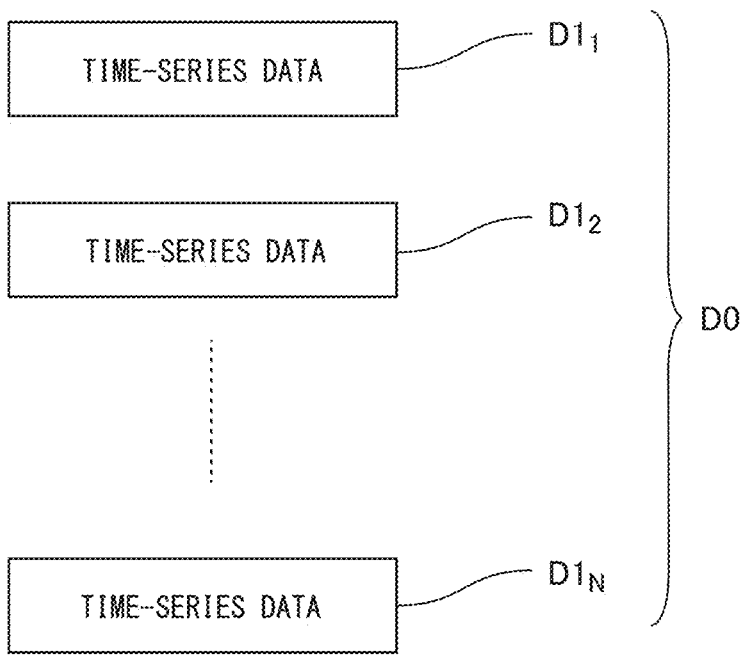
FIG. 10A is an explanatory diagram illustrating teacher data according to the embodiment.

FIG. 10A is an explanatory diagram illustrating teacher data D0 that is obtained. The worker 151 executes the processing from step S100 to step S104, that is, the assembly work a plurality of times, that is, N times, and in the case where the assembly work has been performed N times in step S105, that is, in the case where the result of step S105 is YES, the worker 151 causes the learning portion 601 to perform machine learning for the next step S106. The predetermined number N can be determined by the worker 151. By performing such a work, the teacher data D0 including time-series data $D1_1$ to $D1_N$ corresponding to the N times of work can be obtained. In the description below, the "time-series data" will be also referred to as "work data".

FIGS. 9A to 9E illustrate the assembly work by the worker 151 in time series. The worker 151 draws the workpiece W11 on the workpiece W12 while sliding the finger 151F along the workpiece W11 from the vicinity of the root end of the workpiece W11 to the vicinity of the distal end of the workpiece W11, and performs the assembly work of coupling the distal end of the workpiece W11 to the connector of the workpiece W12. When the worker 151 performs the assembly work, the force sensor 501 is in contact with the workpiece W11. A gripping force and a shearing force are applied to the workpiece W11 by the worker 151, the force sensor 501 detects these forces, and the learning portion 601 obtains information corresponding to the forces.

Figure 10B:
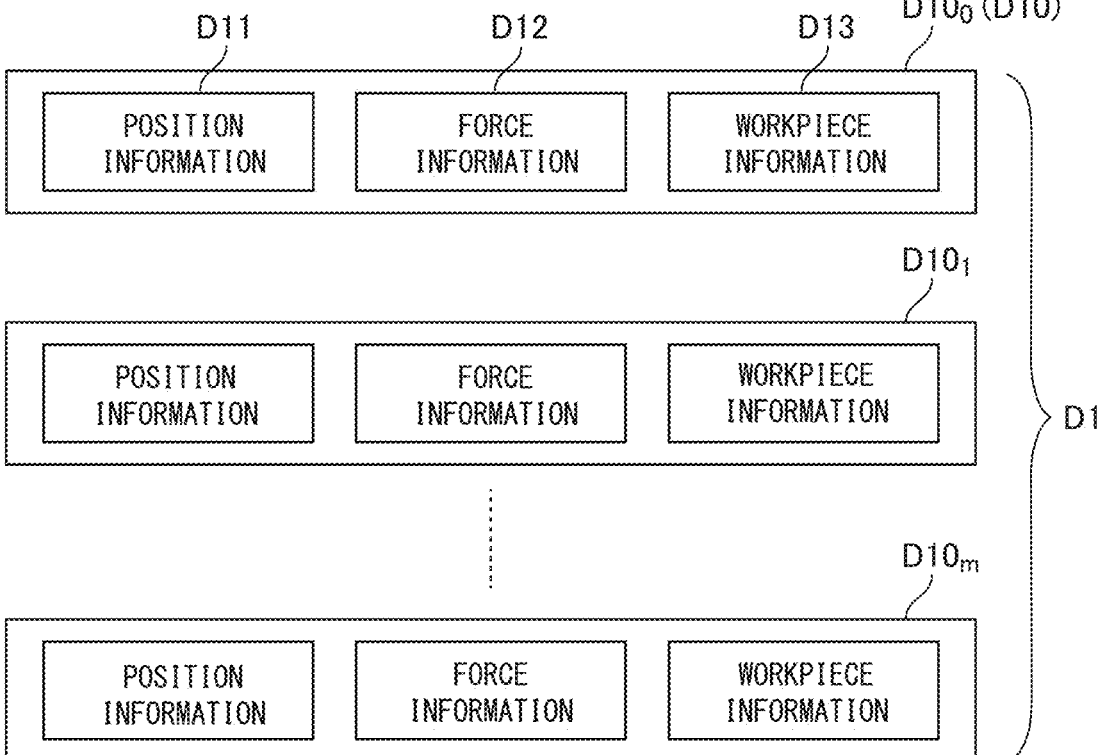
FIG. 10B is an explanatory diagram of a piece of time-series data among a plurality of pieces of time-series data included in the teacher data according to the embodiment.

FIG. 10B is an explanatory diagram of time-series data D1 that is one piece of data among a plurality of pieces of time-series data $D1_1$ to $D1_N$ included in the teacher data D0. The time-series data D1 includes a plurality of pieces of, for example, (m+1) pieces of sampling data $D10_0$ to $D10_m$ obtained in time series. Each of the sampling data $D10_0$ to $D10_m$ will be referred to as sampling data D10. The sampling data D10 is measurement data including position information D11, force information D12, and workpiece information D13. In one piece of sampling data D10, the position information D11, the force information D12, and the workpiece information D13 are obtained in correspondence with the same timing. That is, the learning portion 601 obtains the captured image 320I, the force information D12, and the captured image 330I in synchronization. The position information D11 is position information about the position of the feature portion 321. The force information D12 is force information about the force acting on the tool 310 and obtained from the force sensor 501 described above. The workpiece information D13 is information about the state of the workpiece W11 described above, and is included in the captured image 330I illustrated in FIG. 6B. That is, the captured image 330I includes the workpiece image W11I as the workpiece information D13. The position information D11 is an example of first position information. The force information D12 is an example of first force information. The workpiece information D13 is an example of first workpiece information.

FIG. 11 is an explanatory diagram illustrating an example of the time-series data D1 according to the embodiment. FIG. 11 illustrates one piece of time-series data D1 among a plurality of pieces of time-series data $D1_1$ to $D1_N$ as an example. At a time t, the force information obtained from the force sensor 501 is expressed by information of, for example, forces Fx [N], Fy [N], and Fz [N], and moments Mx [Nm], My [Nm], and Mz [Nm]. In addition, the position information about the position of the feature portion 321 obtained from the captured image 320I obtained by an image pickup operation by the camera 320 at the time t is expressed by, for example, information of a position x [m], y [m], z [m], and a posture a [deg.], b [deg.], c [deg.].

The workpiece information D13 about the state of the workpiece W11 is image information obtained from the captured image 330I, that is, the workpiece image Will. To be noted, the time-series data D11 illustrated in FIG. 11 is an example, and any other time-series data may be used as long as the data includes position information of the feature portion 321, the force information, and the workpiece information about the state of the workpiece W11.

The position information D11 is information required for controlling the robot 400. Therefore, the position information D11 may be position information of the feature portion 321 itself obtained from the captured image 320I, but is preferably position information obtained by converting the position information of the feature portion 321 to a coordinate system of the robot 400. For example, the position information D11 is position information of the origin of the force sensor 501 in the coordinate system of the robot 400 obtained by converting the position information of the feature portion 321 by a predetermined homogenous transformation matrix.

This conversion work can be performed by calibrating the coordinate system of the camera 320 and the coordinate system of the robot 400. For example, the coordinate system of the camera 320 can be converted to the coordinate system of the robot 400 by a known method such as hand-eye calibration. The conversion work will be described later. As described above, the learning portion 601 obtains the position information D11 on the basis of the captured image 320I.

Figure 12:
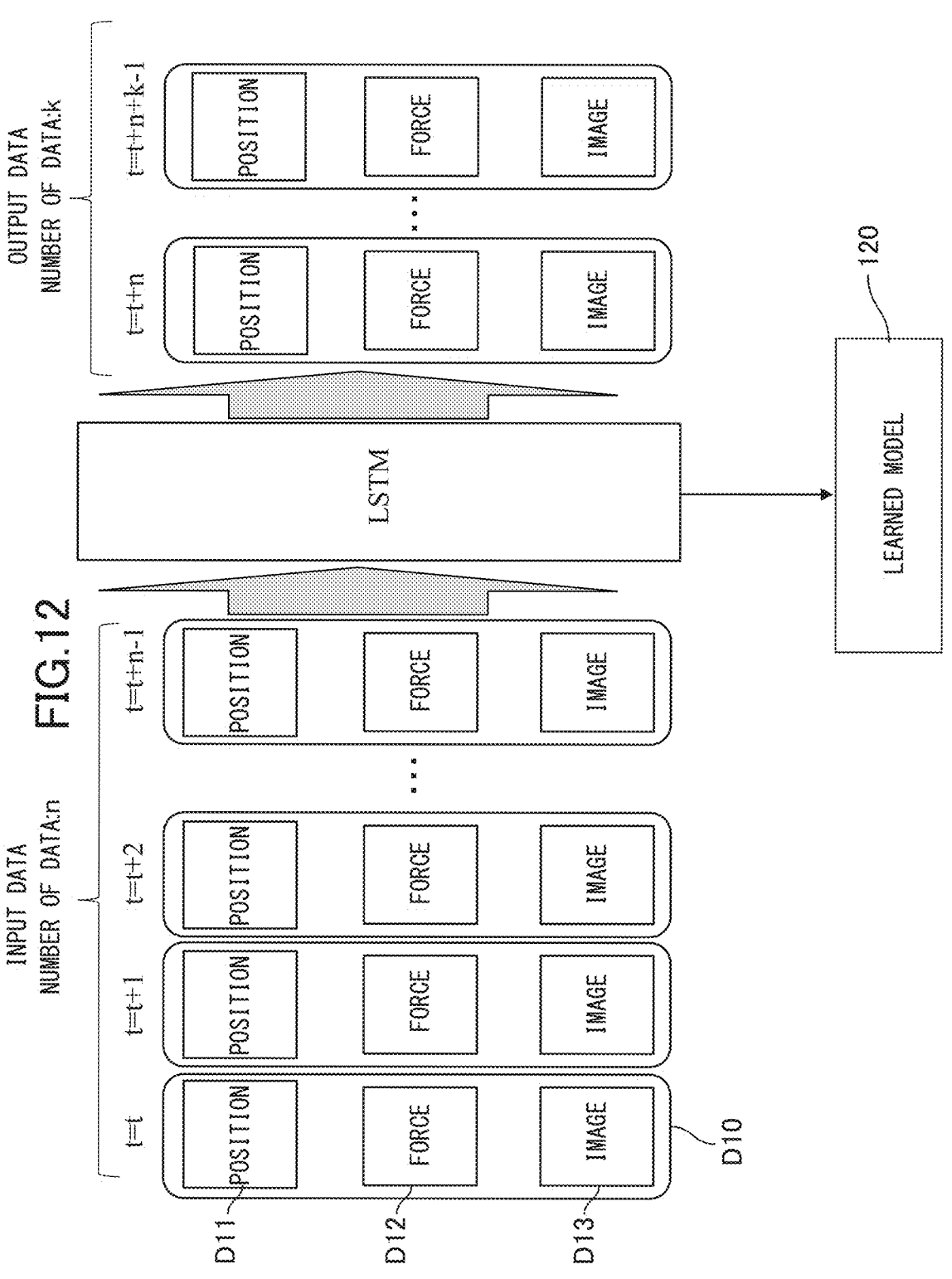
FIG. 12 is an explanatory diagram of learning processing according to the embodiment.

In step S106, the learning portion 601 performs machine learning of the details of work on the basis of the plurality of pieces of time-series data $D1_1$ to $D1_N$, that is, the teacher data D0 that has been obtained. As this machine learning, machine learning using a neural network of long short-term memory: LSTM. FIG. 12 is an explanatory diagram of learning processing according to the embodiment. As illustrated in FIG. 12, in the machine learning using a neural network of LSTM, supervised learning using the plurality of pieces of time-series data $D1_1$ to $D1_N$ as the teacher data D0 is performed.

In LSTM, machine learning is performed by using sampling data corresponding to past and present results as input data and sampling data corresponding to future results as output data among the plurality of pieces of sampling data $D10_0$ to $D10_m$, and the learned model 120 is generated by performing such machine learning on the plurality of pieces of time-series data $D1_1$ to $D1_N$. Specifically, the learning portion 601 learns n pieces of input data including position information, force information, and image information from a certain time t=t to a time t=(t+n−1), and k pieces of output data including position information, force information, and image information from a time t=(t+n) to a time t=(t+n+k−1) among (m+1) pieces of sampling data $D10_0$ to $D10_m$ in association with each other, and outputs the learned model 120. The output data is correct answer data. To be noted, the data number n and the data number k are each a positive integer, and are each a predetermined design value.

Figure 13A:
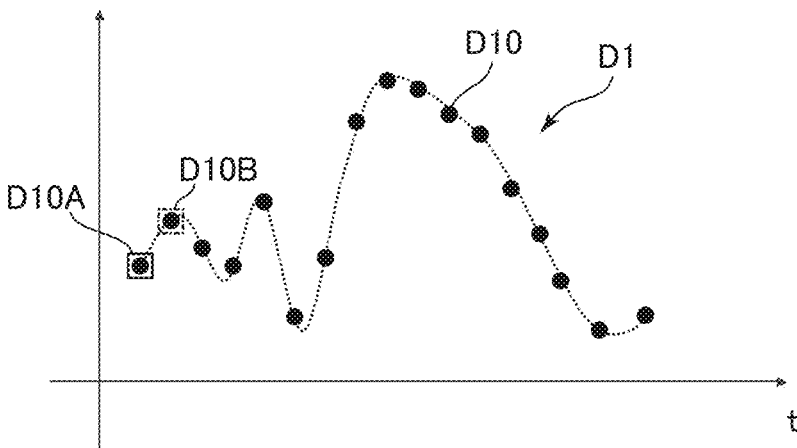
FIG. 13A is an explanatory diagram of machine learning based on the time-series data according to the embodiment.
Figure 13B:
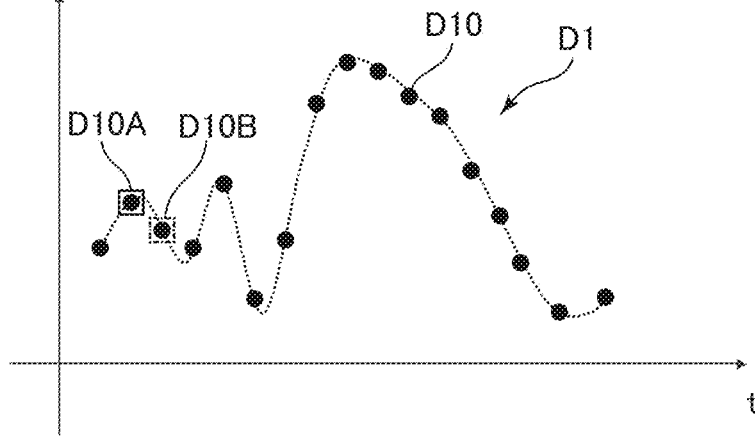
FIG. 13B is an explanatory diagram of machine learning based on the time-series data according to the embodiment.

The processing described above will be described by taking a case of n=1 and k=1 as an example. FIGS. 13A and 13B are explanatory diagrams of machine learning based on the time-series data D1 according to the embodiment. To be noted, in FIGS. 13A and 13B, the horizontal axis represents the time t, and the vertical axis is schematic. In addition, the black circles indicate the sampling data D10. Since n=1 and k=1 hold, the learning portion 601 selects one piece of input data D10A and selects output data (correct answer data) D10B that is the next piece of data with respect to the input data D10A in the time series in correspondence with the input data D10A as illustrated in FIG. 13A. Then, the learning portion 601 performs machine learning for the association between the input data D10A and the output data D10B in accordance with a predetermined algorithm. Next, the learning portion 601 selects next piece of input data D10A and selects output data (correct answer data) D10B that is the next piece of data with respect to the input data D10A in the time series in correspondence with the input data D10A as illustrated in FIG. 13B. Then, the learning portion 601 performs machine learning for the association between the input data D10A and the output data D10B in accordance with a predetermined algorithm. In this manner, the learning portion 601 performs machine learning for all pieces of the sampling data $D10_0$ to $D10_m$ included in one piece of time-series data D1. Further, the learning portion 601 performs the above-described machine learning on the plurality of pieces of time-series data $D1_1$ to $D1_N$.

To be noted, although LSTM is described as an example of the machine learning, the configuration is not limited to this. Any machine learning may be used as long as the machine learning infers a future state on the basis of the current state or a state of the past including the present. For example, a different recurrent neural network: RNN that can temporarily memorize dynamic behaviors in time series as an internal state may be used.

The learned model 120 obtained in this manner is stored in the HDD 105 of the information processing apparatus 101 as illustrated in FIG. 2. In the teacher data D0, the plurality of pieces of time-series data $D1_1$ to $D1_N$ are used for causing the learning to be performed in consideration of variations in the state of the workpiece W11 such as the position of the workpiece W11, the characteristics of the workpiece W11, and the stiffness of the workpiece W11 that slightly change for every work. Next, processing in an inference phase will be described in detail.

Inference

In the automated manufacture unit 170, the actual assembly work of the workpieces W1 and W2 is performed. The controller 602 controls the robot 400 on the basis of an inference result of the learned model 120 obtained from the learning portion 601, and thus causes the robot 400 to couple the workpiece W1 to the workpiece W2. Input data used for the inference processing in the learning portion 601 is obtained from the automated manufacture unit 170.

Figure 14:
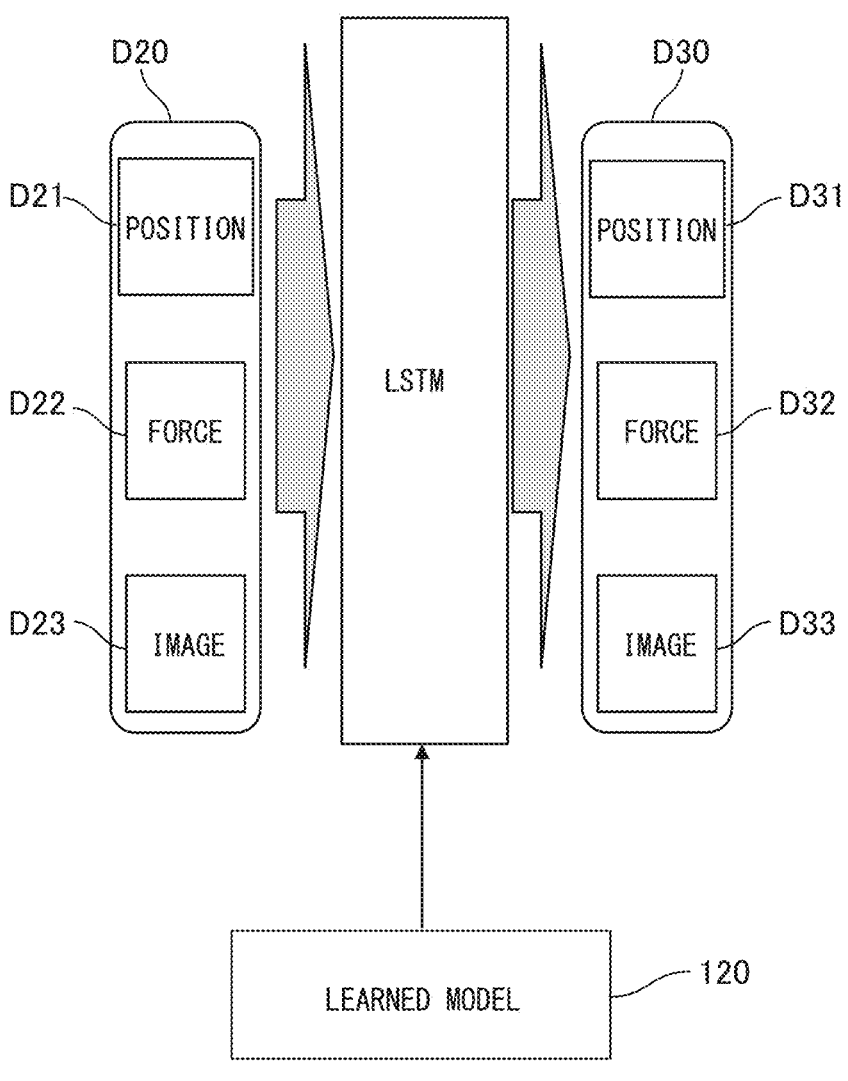
FIG. 14 is an explanatory diagram of inference processing according to the embodiment.

FIG. 14 is an explanatory diagram of the inference processing according to the embodiment. Input data D20 used for the inference by the learned model 120 is preferably in the same format as the sampling data D10 used for the learning. That is, input data D20 for the learned model 120 preferably includes position information D21 about the position of a portion 421 included in the robot hand 402 illustrated in FIG. 1, force information D22 about the force acting on the robot hand 402, and workpiece information D23 about the state of the workpiece W1. The position information D21 is an example of second position information, the force information D22 is an example of second force information, and the workpiece information D23 is an example of second workpiece information.

Output data D30 of the learned model 120 includes position information D31, force information D32, and workpiece information D33. The position information D31 is an example of third position information, the force information D32 is an example of third force information, and the workpiece information D33 is an example of third workpiece information.

The portion 421 illustrated in FIG. 1 is an example of a second portion, and is, for example, a root portion of the robot hand 402. The position information of the portion 421 is obtained by forward kinematics calculation of the robot 400 on the basis of feedback information obtained from the robot 400 when the controller 602 controls the robot 400. The feedback information includes, for example, information of the angles of the joints of the robot arm 401. Therefore, in the present embodiment, the learning portion 601 obtains the position information D21 about the position of the portion 421 from the controller 602.

To be noted, the learning portion 601 may obtain the position information of the feature portion of the robot hand 402 from a captured image obtained from the camera 430 similarly to the position information of the feature portion 321. In this case, the feature portion of the robot hand 402 serves as a second portion. The feature portion of the robot hand 402 preferably includes the marker 321M for tracking as illustrated in FIG. 5C.

The position information D21 is information required for controlling the robot 400, and preferably corresponds to the position information D11. The position information D21 may be position information of the second portion itself, but is preferably position information obtained by converting the position information of the second portion to the coordinate system of the robot 400. For example, in the case where the position information D11 is position information of the origin of the force sensor 501 in the coordinate system of the robot 400, the position information D21 is preferably the position information of the origin of the force sensor 502 in the coordinate system of the robot 400.

The force information D22 about the force acting on the robot hand 402 is obtained from the force sensor 502 provided in the robot hand 402. The force sensor D22 is preferably in the same dimension as the force information D12. For example, in the case where the force information D12 is expressed by a six-dimensional vector, the force information D22 is preferably expressed by a six-dimensional vector.

The force sensor 502 preferably has a performance equivalent to that of the force sensor 501. The force sensor 502 having a performance equivalent to that of the force sensor 501 means that the system of the force sensor 502 is the same as the system of the force sensor 501, or even if the system of the force sensor 502 is different from the system of the force sensor 501, the force sensor 502 has substantially the same sensitivity and substantially the same response to the same force, and obtains substantially the same waveform in response to the same force. Examples of the system include an electric resistance system, an electrostatic capacitance system, a piezoelectric system, and an optical system.

Figure 15:
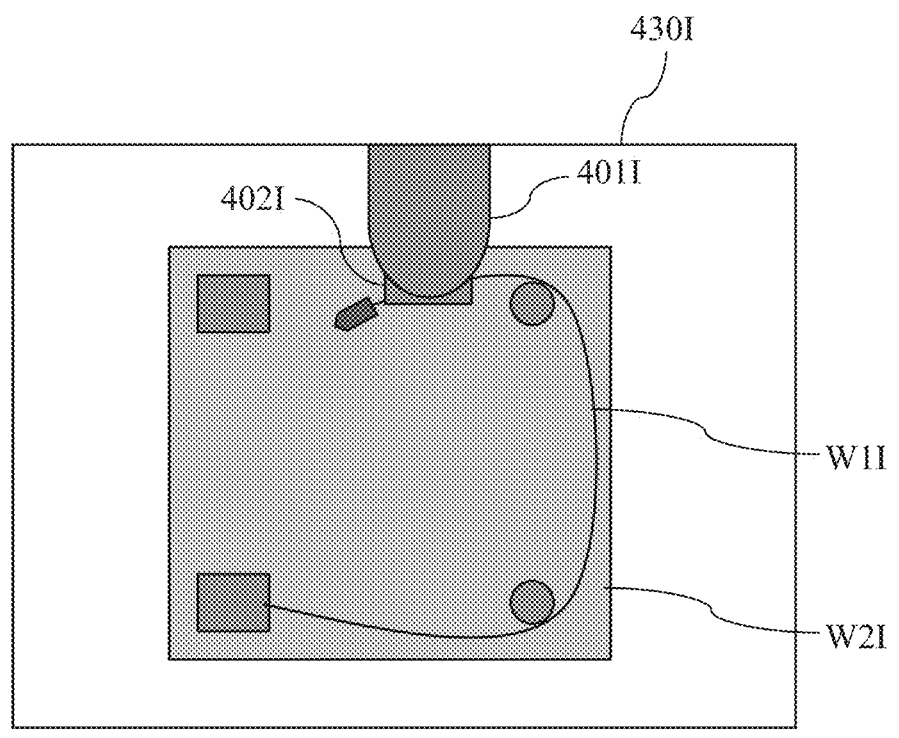
FIG. 15 is an explanatory diagram of a captured image obtained from a third image pickup apparatus according to the embodiment.

FIG. 15 is an explanatory diagram of a captured image 430I obtained from the camera 430 according to the embodiment. By imaging objects including the workpiece W1, the workpiece W2, the robot hand 402, and part of the robot arm 401 by the camera 430, the captured image 430I is obtained. The captured image 430I is an example of a third image. The captured image 430I includes a workpiece image W1I that is a portion corresponding to the workpiece W1, a workpiece image W21 that is a portion corresponding to the workpiece W2, an arm image 401I that is a portion corresponding to the robot arm 401, and a hand image 402I that is a portion corresponding to the robot hand 402. The workpiece W1 is a linear member, and is warped into various states. In the present embodiment, the learning portion 601 obtains workpiece information D23 about the state of the workpiece W1 from the captured image 430I obtained from the camera 430. The workpiece information D23 about the state of the workpiece W1 is image information included in the captured image 430I, that is, the workpiece image W1I corresponding to the workpiece W1 captured in the captured image 430I. To be noted, the camera 430 may be a camera capable of two-dimensional position measurement or a camera capable of three-dimensional position measurement as long as the camera 430 is capable of generating an image from which the workpiece information D23 about the state of the workpiece W1 during work can be obtained. In the present embodiment, workpiece information about the state of the workpiece W2 is also obtained from the captured image 430I. That is, in the case where a plurality of workpieces are targets of a predetermined work, information about the state of the plurality of workpieces are obtained from the captured image 430I.

In addition, the relative positional relationship between the camera 430 and the workpiece W2 is preferably the same as the relative positional relationship between the camera 330 and the workpiece W12. In the case where the learning unit 150 includes a plurality of cameras 330, the automated manufacture unit 170 preferably includes a plurality of cameras 430 having a relative positional relationship that is the same as that of the plurality of cameras 330. In addition, in the case where the work space of the learning unit 150 and the work space of the automated manufacture unit 170 are the same, the camera 320 or the camera 330 may be used, and the camera 430 can be omitted.

Figure 16A:
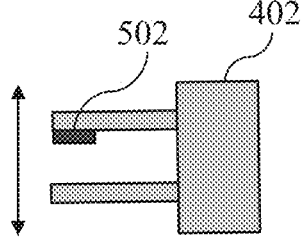
FIG. 16A is an explanatory diagram of a robot hand according to the embodiment.

The robot hand 402 will be described. FIG. 16A is an explanatory diagram of the robot hand 402 according to the embodiment. The robot hand 402 is preferably designed in accordance with the form of the tool 310 used in the learning phase. For example, in the case of an operation of translationally moving fingers by using the tool 310 illustrated in FIG. 5A in the learning phase, the robot hand 402 is preferably a mechanism in which a plurality of fingers move translationally as illustrated in FIG. 16A.

Figure 16B:
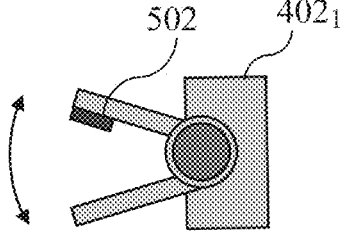
FIG. 16B is an explanatory diagram of a robot hand according to a fifth modification example of the embodiment.

FIG. 16B is an explanatory diagram illustrating a robot hand according to a fifth modification example of the embodiment. A robot hand $402_1$ illustrated in FIG. 16B is a form corresponding to the tool $310_4$ illustrated in FIG. 7C. That is, in the case of a work of opening and closing the tool $310_4$ by pivoting the tool $310_4$ about the axial center in the learning phase as illustrated in FIG. 7C, the robot hand $402_1$ illustrated in FIG. 16B is preferably used.

Figure 16C:
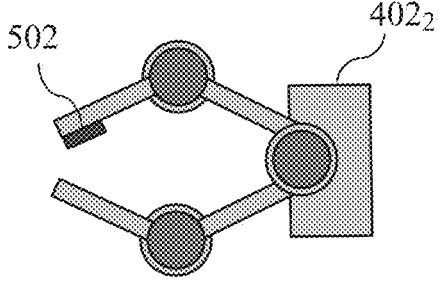
FIG. 16C is an explanatory diagram of a robot hand according to a sixth modification example of the embodiment.

FIG. 16C is an explanatory diagram illustrating a robot hand according to a sixth modification example of the embodiment. A robot hand $402_2$ illustrated in FIG. 16C is a form corresponding to the tool $310_5$ illustrated in FIG. 7D. That is, in the case of a work of opening and closing the articulated tool $310_5$ in the learning phase as illustrated in FIG. 7D, the robot hand $402_2$ illustrated in FIG. 16C is preferably used. As described above, a configuration in which one of the robot hands 402, $402_1$, and $402_2$ is selected in accordance with the motion of the fingers of the worker or the tool to be reproduced may be employed.

In addition, the robot hands 402, $402_1$, and $402_2$ each preferably include a torque control mechanism that controls the torque of the robot fingers to control the gripping force.

Figure 17:
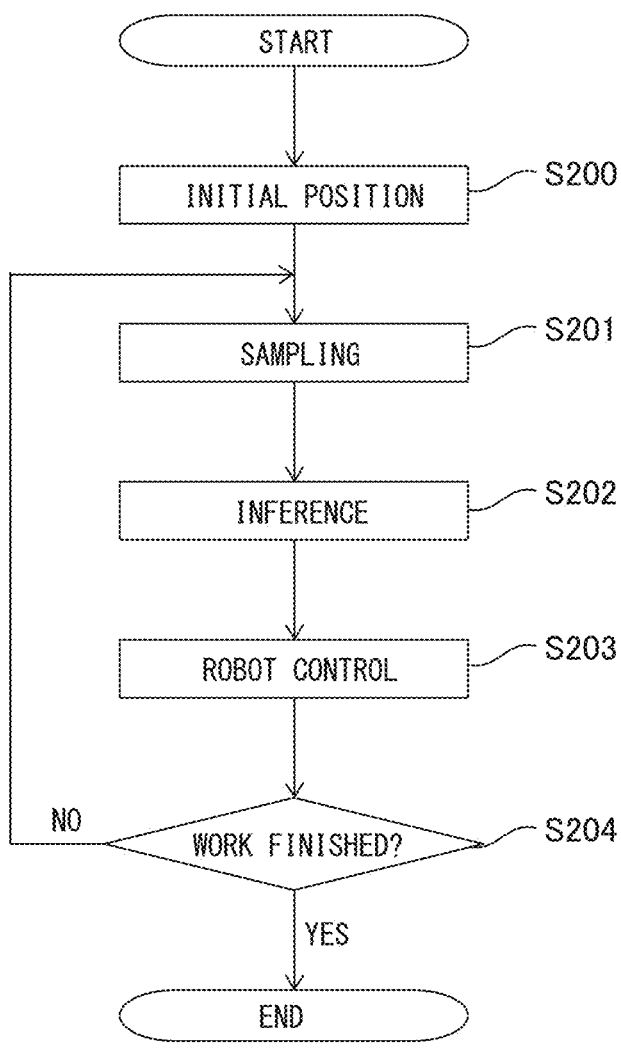
FIG. 17 is a flowchart for executing an assembly work according to the embodiment.

FIG. 17 is a flowchart for executing the assembly work that is an example of the predetermined work according to the embodiment. A flow program for causing the robot 400 to perform the predetermined work is included in the program 152 illustrated in FIG. 2.

In step S200, the controller 602 moves the robot 400 to the initial position determined in step S100 of FIG. 8.

In step S201, the learning portion 601 samples the captured image 430I from the camera 430, the position information D21 from the controller 602, and the force information D22 from the force sensor 502. The learning portion 601 obtains the workpiece information D23 from the captured image 430I. The input data D20 including the position information D21, the force information D22, and the workpiece information D23 is input to the learned model 120. The pieces of information D21, D22, and 430I are preferably obtained in synchronization, that is, preferably obtained at the same timing. The sampling rate may be determined in accordance with the control rate of the controller 602, and may be equal to or different from the sampling rate at which the sampling data has been obtained in the learning processing.

Figure 18:
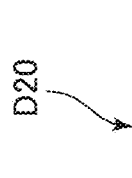
FIG. 18 is an explanatory diagram illustrating an example of input data according to the embodiment.

FIG. 18 is an explanatory diagram illustrating an example of the input data D20 according to the embodiment. As illustrated in FIG. 18, the input data D20 is in the same format as the time-series data D1. The force information is expressed by information of, for example, forces Fx [N], Fy [N], and Fz [N], and moments Mx [Nm], My [Nm], and Mz [Nm]. In addition, the position information is expressed by, for example, information of a position x [m], y [m], z [m], and a posture a [deg.], b [deg.], c [deg.]. In addition, the workpiece information is image information obtained from the captured image 430I.

In step S202, the learning portion 601 performs inference processing on the basis of the input data D20, and outputs the output data D30 representing the inference result. The learning portion 601 performs the inference processing by loading the learned model 120 to the same machine learning model as that used for learning (that is, LSTM). The output data D30 includes position information D31, force information D32, and workpiece information D33. The position information D31 is position information about the position to which the portion 421 of the robot 400 should move next.

The force information D32 is force information about the gripping force that should be applied by the robot hand 402 next. The workpiece information D33 is workpiece information about a state that the workpiece W1 should take next. To be noted, in the control of the robot 400, in the case where the workpiece information D33 is not used, the workpiece information D33 does not have to be included in the output data D30.

In step S203, the controller 602 controls the robot 400 on the basis of the output data D30. Specifically, the controller 602 controls the operation of the robot arm 401 on the basis of the position information D31. In addition, the controller 602 controls the gripping force of the robot hand 402 on the basis of the force information D32. Control of these is preferably performed before the next input data D20 is sampled. As described above, the output data D30 serves as a control command value for the controller 602.

As described above, the controller 602 can move the robot hand 402 to a position obtained by the inference processing by the learning portion 601, and can cause the robot hand 402 to grip the workpiece W1 by a gripping force obtained by the inference processing by the learning portion 601.

Next, in the case where the assembly work by the robot 400 is not finished, that is, in the case where the result of step S204 is NO, the process returns to step S201, and the learning portion 601 samples the next information D21, D22, and 430I. In the case where the assembly work by the robot 400 is finished, that is, in the case where the result of step S204 is YES, the process is finished.

As described above, according to the present embodiment, since the learned model 120 based on the motion of the worker 151 is obtained, the robot 400 can be moved smoothly and precisely as if the motion of the worker 151 is reproduced. As a result of this, awkwardness of the motion of the robot 400 is reduced, and the work efficiency of the robot 400 is improved. In addition, the worker 151 can start up the automated manufacture unit 170 in a relatively short time without a specialized knowledge.

Figure 19:
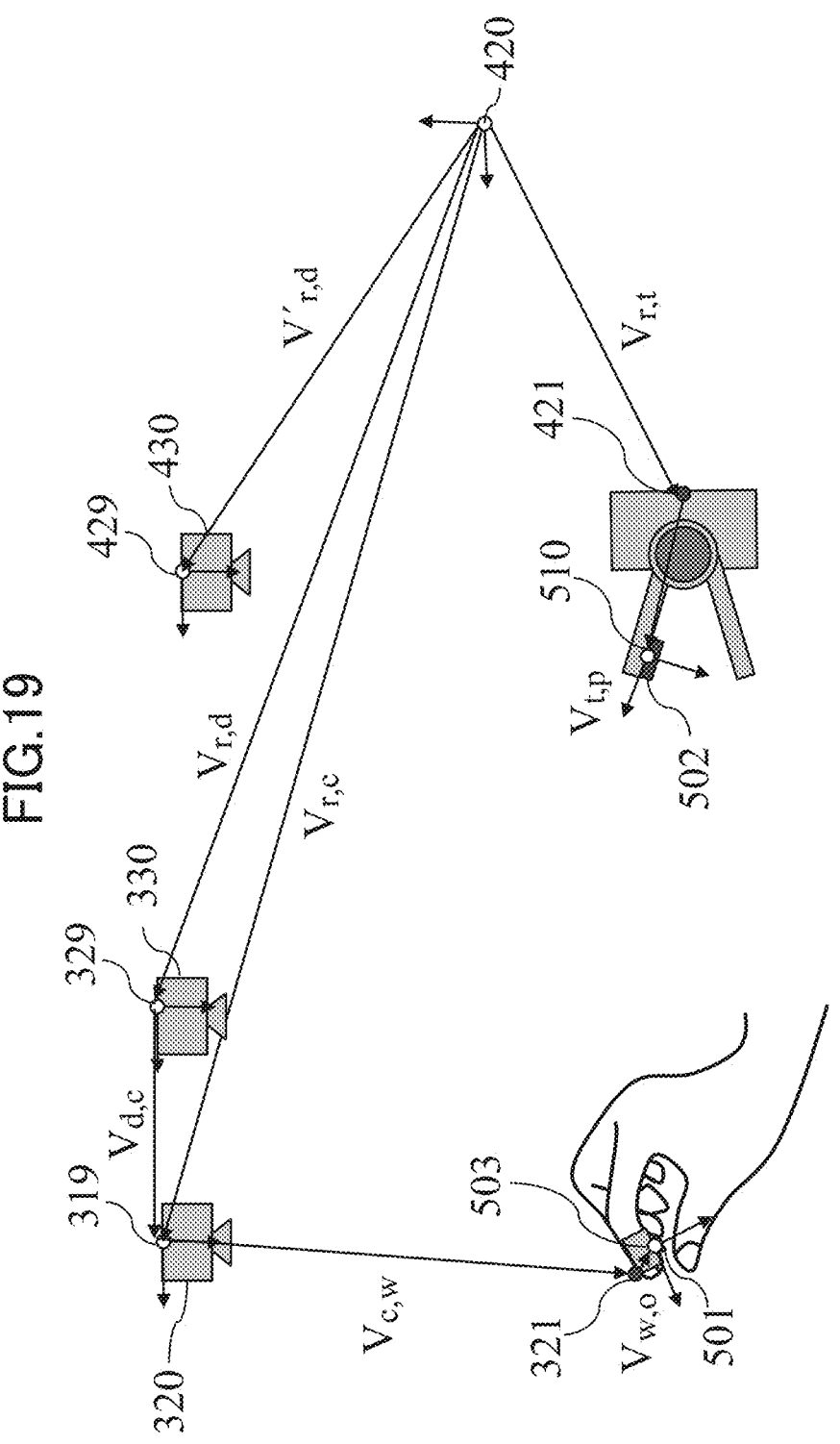
FIG. 19 is an explanatory diagram of a coordinate system according to the embodiment.

FIG. 19 is an explanatory diagram of the coordinate system according to the embodiment. In the present embodiment, in step S203, the controller 602 moves the robot arm 401 such that an origin 503 of the force sensor 501 and an origin 510 of the force sensor 502 coincide.

The origin 503 of the force sensor 501 and the origin 510 of the force sensor 502 are preferably expressed in a coordinate system from the perspective of the robot 400. Position information $V_{c,w}$ of the feature portion 321 as viewed from the camera 320 can be obtained by detecting the marker 321M illustrated in FIG. 5C or the like by using a six-dimensional vector representing translations and rotations such as (x, y, z, a, b, c). In addition, position information $V_{w,o}$ of the origin 503 of the force sensor 501 as viewed from the feature portion 321 can be obtained in advance by using the six-dimensional vector representing translations and rotations and design values or measured values. Therefore, in the case where homogenous transformation matrices of the position information $V_{c,w}$ and $V_{w,o}$ are respectively represented by and $R_{w,o}$, the origin 503 of the force sensor 501 as viewed from the camera 320 can be obtained by homogenous transformation by $R_{c,w} \times R_{w,o}$.

Next, a positional relationship $V_{r,c}$ between an origin 420 of the robot 400 and the camera 320 can be obtained by a known technique such as hand-eye calibration in the case where the worker 151 and the robot 400 share the same work area. In the case where the work area of the worker 151 and the work area of the robot 400 are different, the positional relationship $V_{r,c}$ can be calculated by the following method.

The relative positional relationship between the camera 430 and the workpiece W2 is the same as the relative positional relationship between the camera 330 and the workpiece W12. As viewed from the workpiece W2, there is no problem in the work to be performed later even in the case where relative positional relationship between the camera 430 and the origin 420 of the robot 400 and relative positional relationship $V_{r,d}$ between the camera 330 and the origin 420 of the robot 400 are treated as $V'_{r,d} = V_{r,d}$. Therefore, the positional relationship $V_{r,c}$ does not need to be obtained.

In addition, the positional relationship $V'_{r,d}$ can be obtained by a known technique such as hand-eye calibration, and a relative positional relationship $V_{d,c}$ between the camera 320 and the camera 330 can be obtained by a known technique such as camera calibration. In the case where homogenous transformation matrices corresponding to the positional relationships $V'_{r,d}$ and $V_{d,c}$ are represented by $R'_{r,d}$ and $R_{d,c}$, the origin 503 of the force sensor 501 as viewed from the origin 420 of the robot 400 can be obtained by $R'_{r,d} \times R_{d,c} \times R_{c,w} \times R_{w,o}$.

Subsequently, the position of the origin 510 of the force sensor 502 as viewed from the robot 400 can be obtained from the portion 421 of the robot hand 402. In addition, a positional relationship $V_{r,t}$ between the origin 420 of the robot 400 and the portion 421 of the robot hand 402 can be obtained from a motor encoder or the like of a joint incorporated in the robot 400. In addition, a relative positional relationship $V_{t,p}$ between the portion 421 of the robot hand 402 and the origin 510 of the force sensor 502 can be obtained in advance by using design values or measurement values. In the case where the homogenous transformation matrices of the positional relationships $V_{r,t}$ and $V_{t,p}$ are respectively represented by $R_{r,t}$ and $R_{t,p}$, the origin 510 of the force sensor 502 can be expressed by $R_{r,t} \times R_{t,p}$ in the coordinate system of the robot 400.

In this manner, the robot 400 can be moved so as to match the position of the origin 503 of the force sensor 501 with the position of the origin 510 of the force sensor 502. This can be expressed by similar processing also in the case of using the plurality of force sensors $501_1$ to $501_3$ as illustrated in FIG. 7A. In addition, as illustrated in FIG. 7B, also in the case where no force sensor is provided in the tools $310_2$ and $310_3$, the operation can be expressed by similar processing by determining a point substituting the origin of the force sensor in advance.

Incidentally, depending on the configuration of the robot 400, a case where the origin 510 of the force sensor 502 cannot be moved to the position of the origin 503 of the force sensor 501 can arise. This occurs in the case where, for example, the posture of the robot 400 exceeds the movable range of the robot 400, that is, where the posture is a singular point in the control of the robot 400. Therefore, at the stage of the learning processing, data serving as a singular point in the control of the robot 400 is preferably excluded from the teacher data D0, that is, data serving as a singular point is preferably not included in the teacher data D0.

Figure 20:
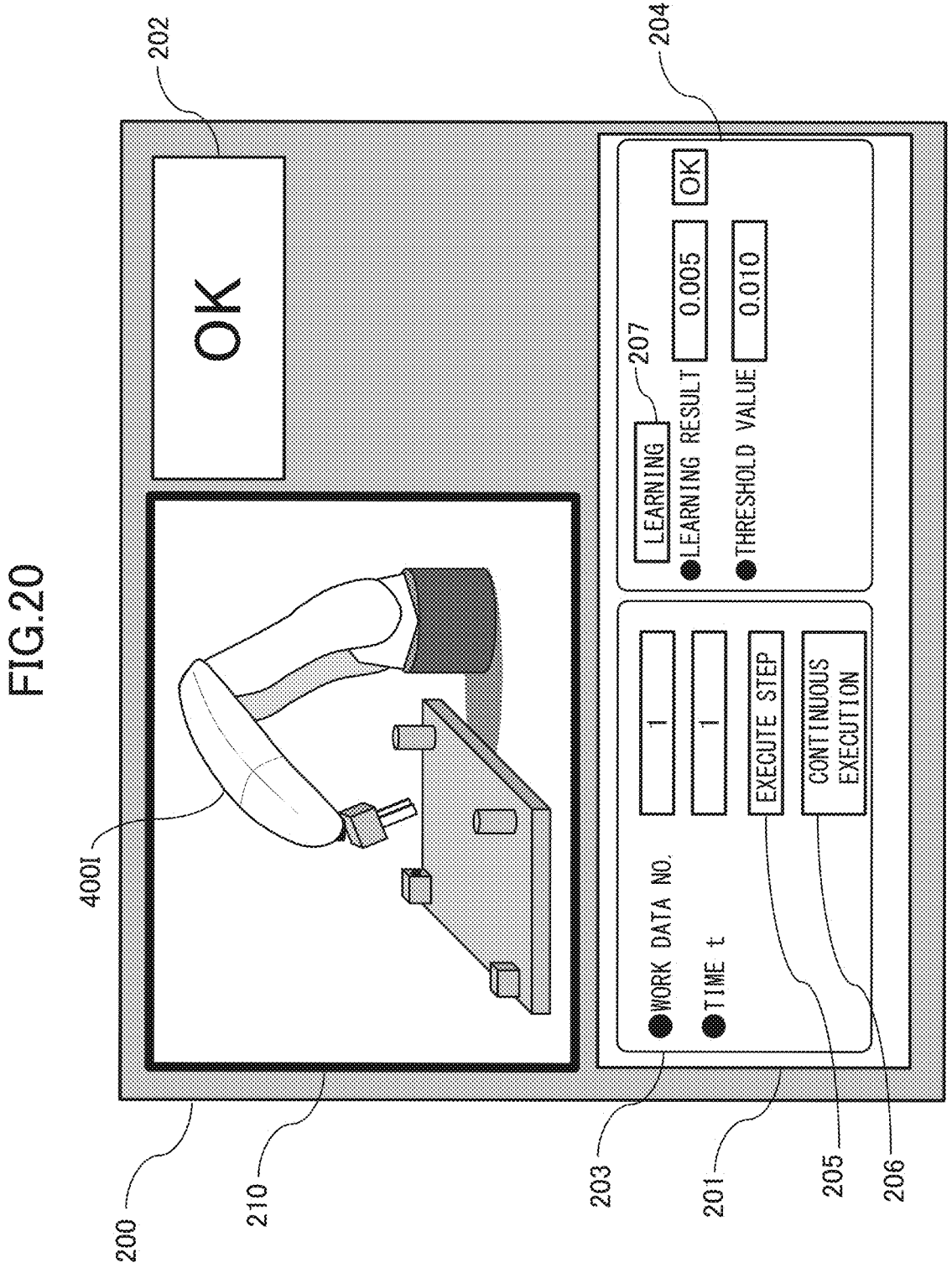
FIG. 20 is an explanatory diagram of a graphical user interface (GUI) according to the embodiment.

Whether or not the work is within the movable range of the robot 400 can be known by using a simulation tool of the robot. FIG. 20 is an explanatory diagram of a graphical user interface: GUI 200 according to the embodiment. The user can know whether or not the work is within the movable range of the robot 400 by looking at the GUI 200. The GUI 200 is displayed on the display 108 of the information processing apparatus 101 of FIG. 2. The simulation tool is included in the program 152.

The learning portion 601 displays the GUI 200 on the display 108. The GUI 200 includes a window 210 that displays the motion of the robot 400 visualized by the simulation tool, a command window 201, and a result display window 202. The command window 201 includes a checking operation panel 203 and a learning operation panel 204.

The user can check the motion of the robot 400 on the GUI 200 for the work data D1 to $D1_N$ corresponding to the predetermined number N times of work obtained in step S106 of FIG. 8. That is, the learning portion 601 performs computer simulation of motion of a virtual robot corresponding to the robot 400 on the basis of each of the work data $D1_1$ to $D1_N$, and displays the results thereof continuously or frame by frame on the window 210 of the GUI 200.

Specifically, the work data $D1_1$ to $D1_N$ each include a plurality of pieces of sampling data D10, and each of the sampling data D10 includes the position information D11. The learning portion 601 obtains the posture of the robot 400 by inverse kinematics calculation of the robot 400 on the basis of the position information D11, and displays a robot image 4001 corresponding to the robot 400 in that posture on the window 210 of the GUI 200.

The checking operation panel 203 includes a field for the user to input a parameter of "Work Data No." and a field for the user to input a parameter of "Time t". The user can input one piece of work data D1 among the work data $D1_1$ to $D1_N$ of the predetermined number N times of work as the "Work Data No.". In addition, the user can input the parameter of "Time t" for the "Work Data No.".

When the user presses a step execution button 205, the learning portion 601 performs the inverse kinematics calculation on the basis of, for example, the position information at the time t illustrated in FIG. 11, and calculates the posture of the robot 400. The learning portion 601 displays an image "OK" on the result display window 202 in the case where the posture of the robot 400 is successfully calculated, and displays an image "NG" indicating a warning on the result display window 202 in the case where the posture of the robot 400 cannot be successfully calculated, that is, in the case where the posture is out of the movable range.

That is, the learning portion 601 issues a warning in the case where the posture of the robot 400 based on the position information D11 is a singular point in the control of the robot 400. The learning portion 601 displays the image "NG" indicating a warning on the result display window 202 as a preferable example of the warning. To be noted, the warning may be performed by reproducing sound data instead of displaying an image.

As described above, each time the user presses the step execution button 205, the learning portion 601 displays the robot image 4001 of the sampling data $D10_0$ to $D10_m$ of the input "Work Data No." from t=0 to t=m on the window 210 frame by frame in time series. As a result of this, the user can check whether or not the robot 400 can operate on the result display window 202 for each of the sampling data $D10_0$ to $D10_m$.

In addition, when the user presses a continuous execution button 206, the learning portion 601 displays the robot image 4001 of all the sampling data $D10_0$ to $D10_m$ of the input "Work Data No." from t=0 to t=m on the window 210 continuously in time series. As a result of this, whether or not the robot 400 can operate can be checked by computer simulation. Also in this case, for the selected work data D1, "OK" is displayed on the result display window 202 if there is no singular point of the robot 400 from the beginning to the end, and "NG" is displayed if there is at least one singular point of the robot 400.

In the case where none of the work data $D1_1$ to $D1_N$ has a singular point, the user can press a learning button 207, and cause the learning portion 601 to perform learning by using the work data $D1_1$ to $D1_N$ as the teacher data D0 in step S106 of FIG. 8.

To be noted, the learning portion 601 displays whether or not the learning results are good on the learning operation panel 204. Whether or not the learning results are good is determined on the basis of an output result of a loss function in the machine learning. Various methods for determining whether or not the learning results are good are known, and whether or not the learning results are good can be determined on the basis of output of these and threshold values set in advance. For example, in the case of LSTM, a minimum square error in verification data after executing the learning a predetermined number of times is output.

Figure 21:
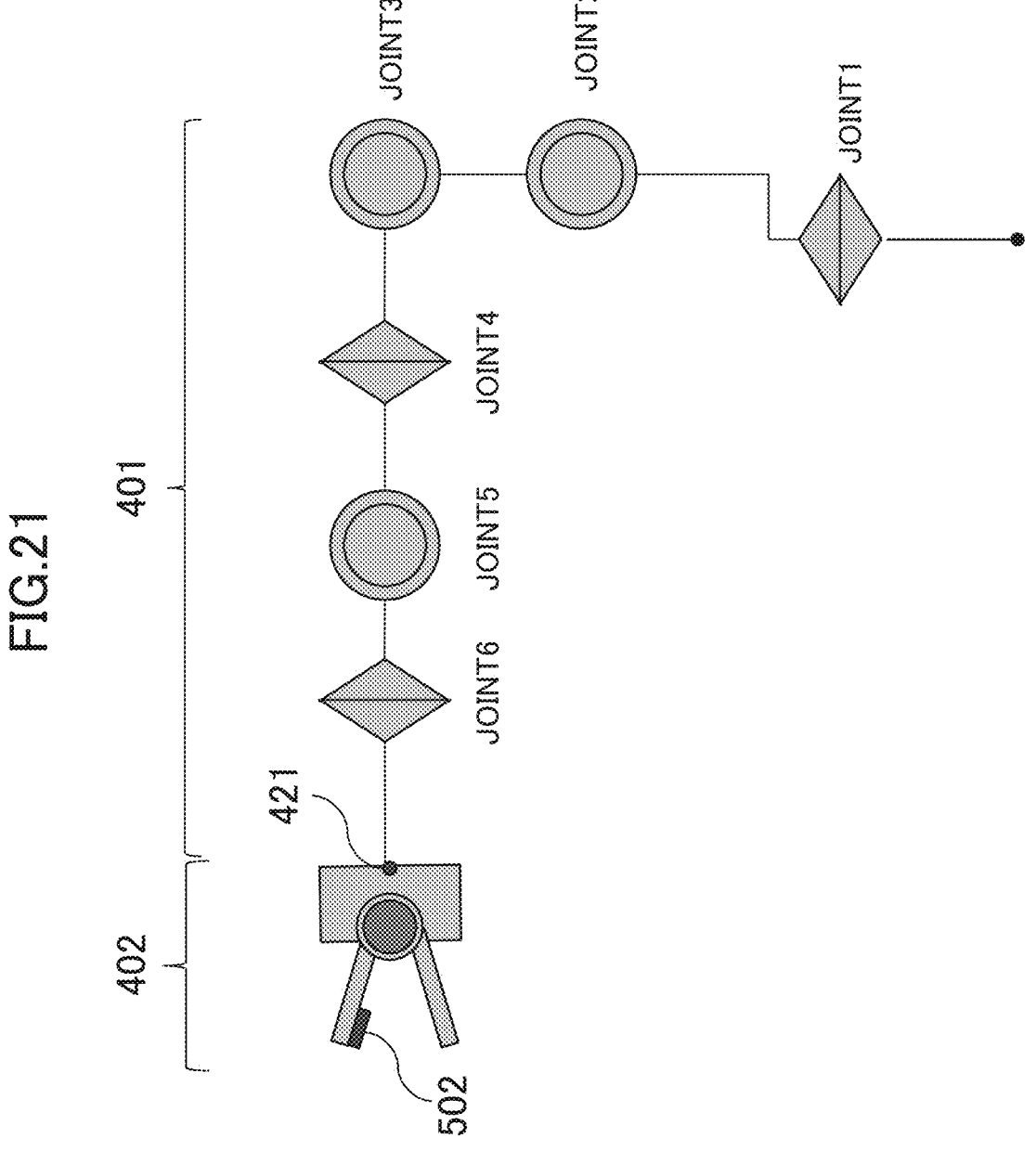
FIG. 21 is an explanatory diagram of a robot according to the embodiment.
Figure 22:
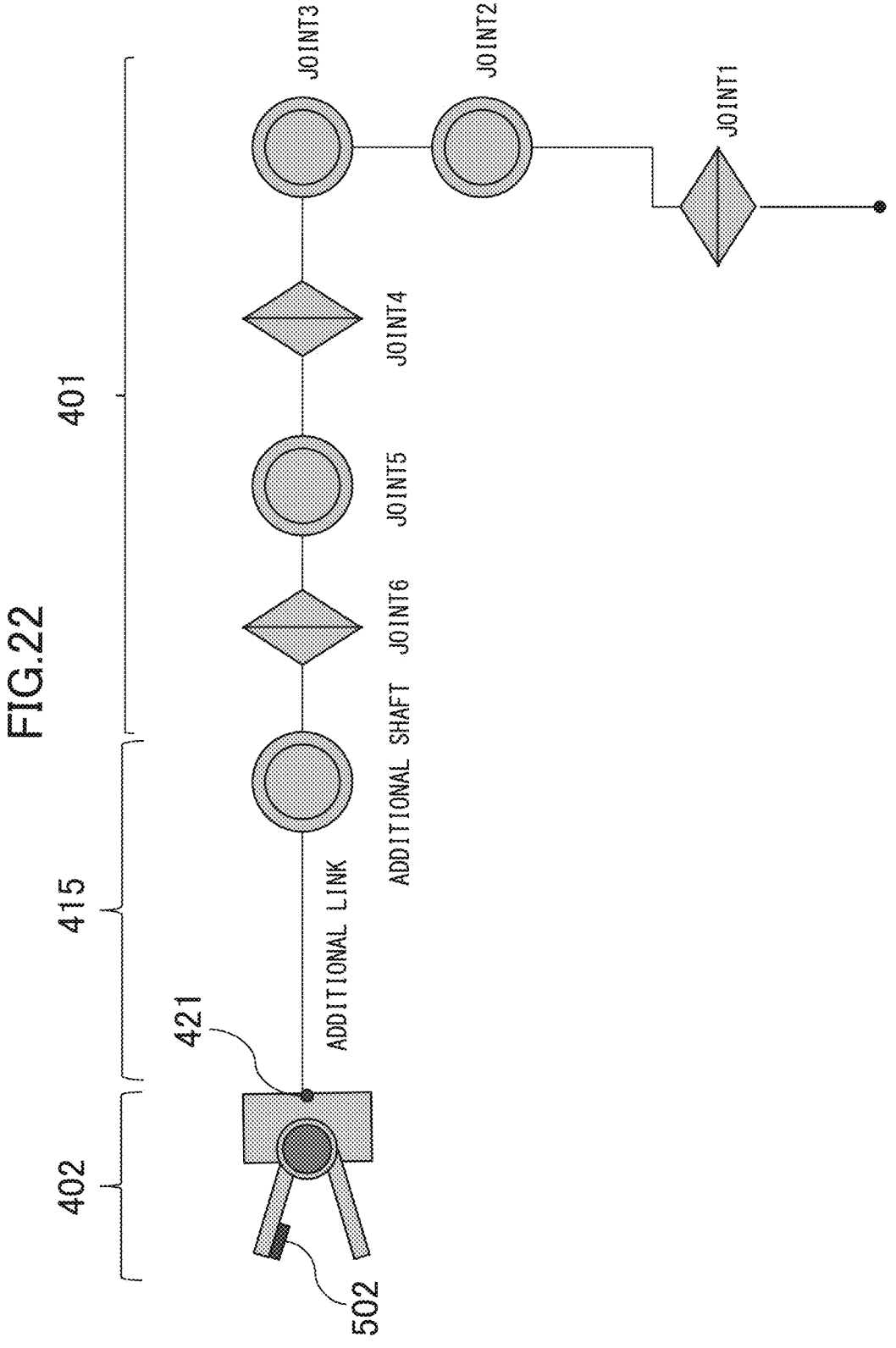
FIG. 22 is an explanatory diagram of a robot according to the embodiment.

Next, what is performed in the case where a singular point is found in such a checking work will be described. Such a case can be addressed by adding an additional shaft to the robot 400. For example, in the case where the robot 400 is a six-axis articulated robot as illustrated in FIG. 21, the number of the joints and the length of the links of the robot arm 401 are fixed. In the case where the posture of the robot 400 exceeds the movable range in such a configuration, the movable range of the robot 400 can be widened by adding an additional shaft portion 415 including an additional shaft and an additional link between the robot arm 401 and the robot hand 402 as illustrated in FIG. 22.

In the robot control of the present embodiment, the robot 400 is controlled with reference to the origin of the force sensor 502. Therefore, in the computer simulation, the additional shaft portion 415 configured to enable the inverse kinematics calculation of the robot 400 can be obtained. Further, in the actual robot 400, the additional shaft portion 415 having the configuration obtained by the calculation may be added between the robot arm 401 and the robot hand 402.

To be noted, although there is a difference between the output result of the camera 330 and the output result of the camera 430 in that the hand 151H of the worker 151 is captured in the image or the robot hand 402 of the robot 400 is captured in the image, the output result of the camera 330 and the output result of the camera 430 are approximately the same except for this difference. Such a difference affects the work precision of the robot 400, but can be ignored in the case of a rough work. In the case where the work precision needs to be further improved, such a difference is preferably reduced.

Figure 23:
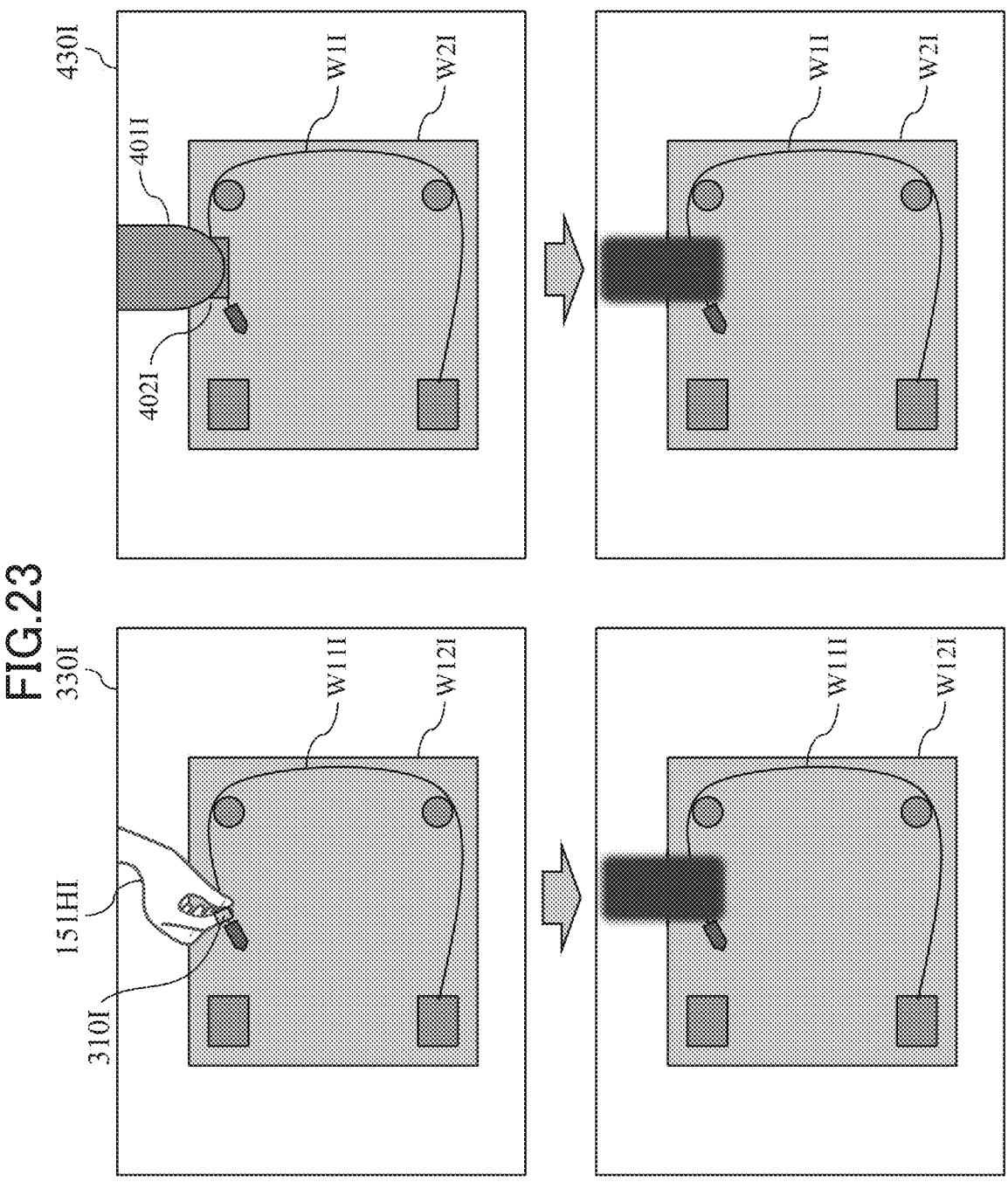
FIG. 23 is an explanatory diagram of a seventh modification example of the embodiment.

FIG. 23 is an explanatory diagram illustrating an image of a seventh modification example of the embodiment. As illustrated in FIG. 23, there is a method of masking the difference portion between the two captured images 330I and 430I. The learning portion 601 may obtain the workpiece information D13 by masking a portion corresponding to the worker 151 and the tool 310 in the captured image 330I, that is, the hand image 151HI and the tool image 310I. Similarly, the learning portion 601 may obtain the workpiece information D23 by masking a portion corresponding to the robot 400 in the captured image 430I, that is, the arm image 401I and the hand image 402I.

Since the position of the finger 151F of the worker 151 and the position of the robot finger 402F of the robot hand 402 can be obtained by the camera 320 and the robot controller 403, the masking processing can be performed on the two captured images 330I and 430I. The difference between the two captured images 330I and 430I can be reduced by such masking processing.

To be noted, in the case where the image information of the finger 151F and the robot finger 402F is excessively lost by the masking processing, the loss by the masking processing can be reduced by performing the imaging from a plurality of directions.

In addition, the camera 330 may be omitted, and the workpiece information D13 may be obtained from the captured image 320I obtained from the camera 320. In this case, the learning portion 601 may obtain the workpiece information D13 by masking a portion corresponding to the worker 151 and the tool 310 in the captured image 320I, that is, the hand image 151HI and the tool image 310I.

Figure 24:
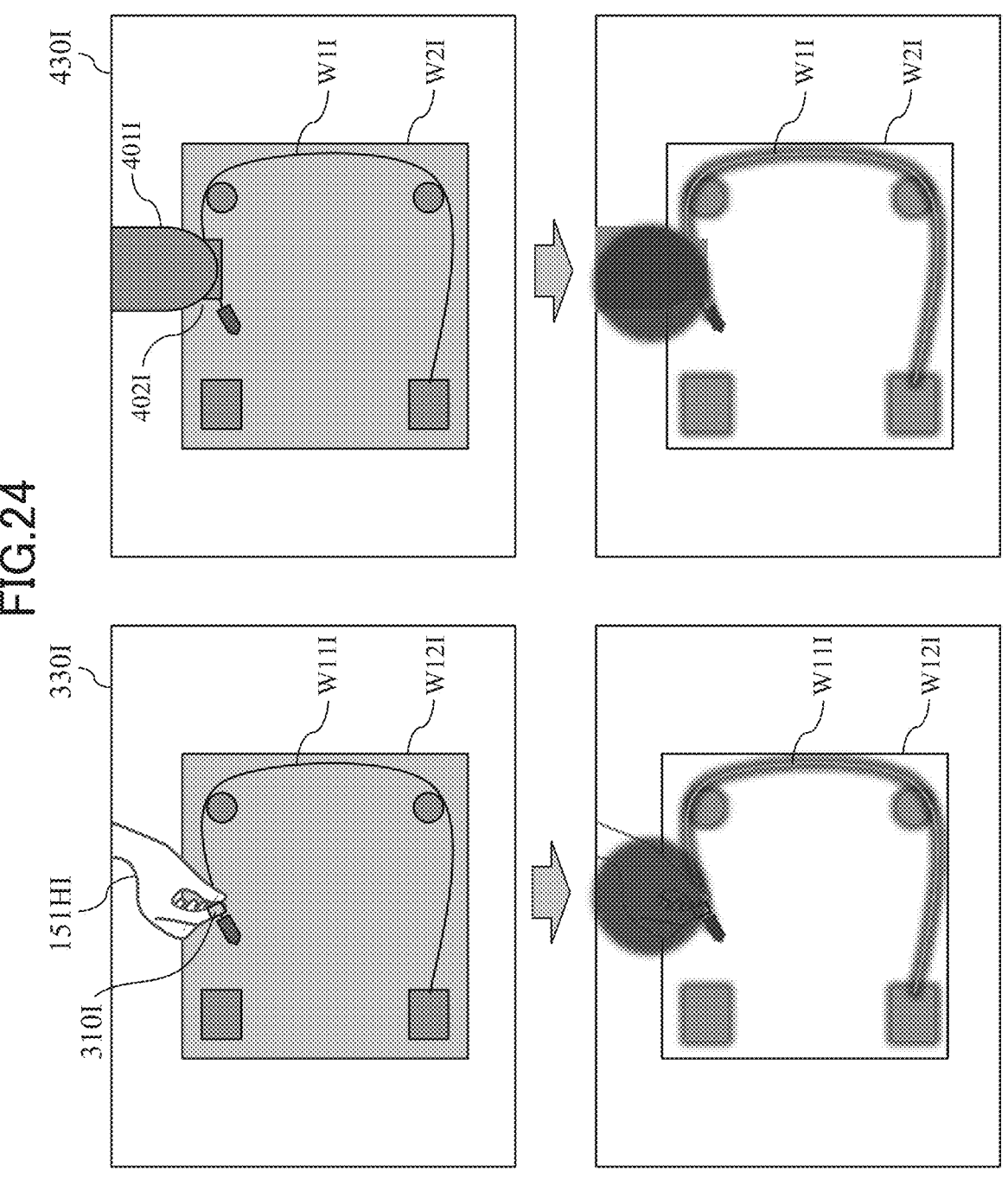
FIG. 24 is an explanatory diagram of an eighth modification example of the embodiment.

FIG. 24 is an explanatory diagram illustrating an image of an eighth modification example of the embodiment. As illustrated in FIG. 24, a configuration in which only a portion of interest is extracted from each of the captured images 330I and 430I by using machine learning such as attention branch network: ABN may be employed.

This processing of extracting a portion of interest is processing of extracting a specific target object in the image as expressed by a blurred portion in FIG. 24. That is, the learning portion 601 may obtain the workpiece information D13 by simplifying the portion corresponding to the worker 151 and the tool 310 in the captured image 330I, that is, the hand image 151HI and the tool image 310I by blurring or the like. Similarly, the learning portion 601 may obtain the workpiece information D23 by simplifying the portion corresponding to the robot 400 in the captured image 430I, that is, the arm image 401I and the hand image 402I by blurring or the like.

As described above, even if there is a portion different between the captured images 330I and the 430I, portions of interest can be matched by simplification processing, and thus the difference between the two captured images 330I and 430I can be reduced.

To be noted, the camera 330 may be omitted, and the workpiece information D13 may be obtained from the captured image 320I obtained from the camera 320. In this case, the learning portion 601 may obtain the workpiece information D13 by simplifying the portion corresponding to the worker 151 and the tool 310 in the captured image 320I, that is, the hand image 151HI and the tool image 310I by blurring or the like.

Figure 25:
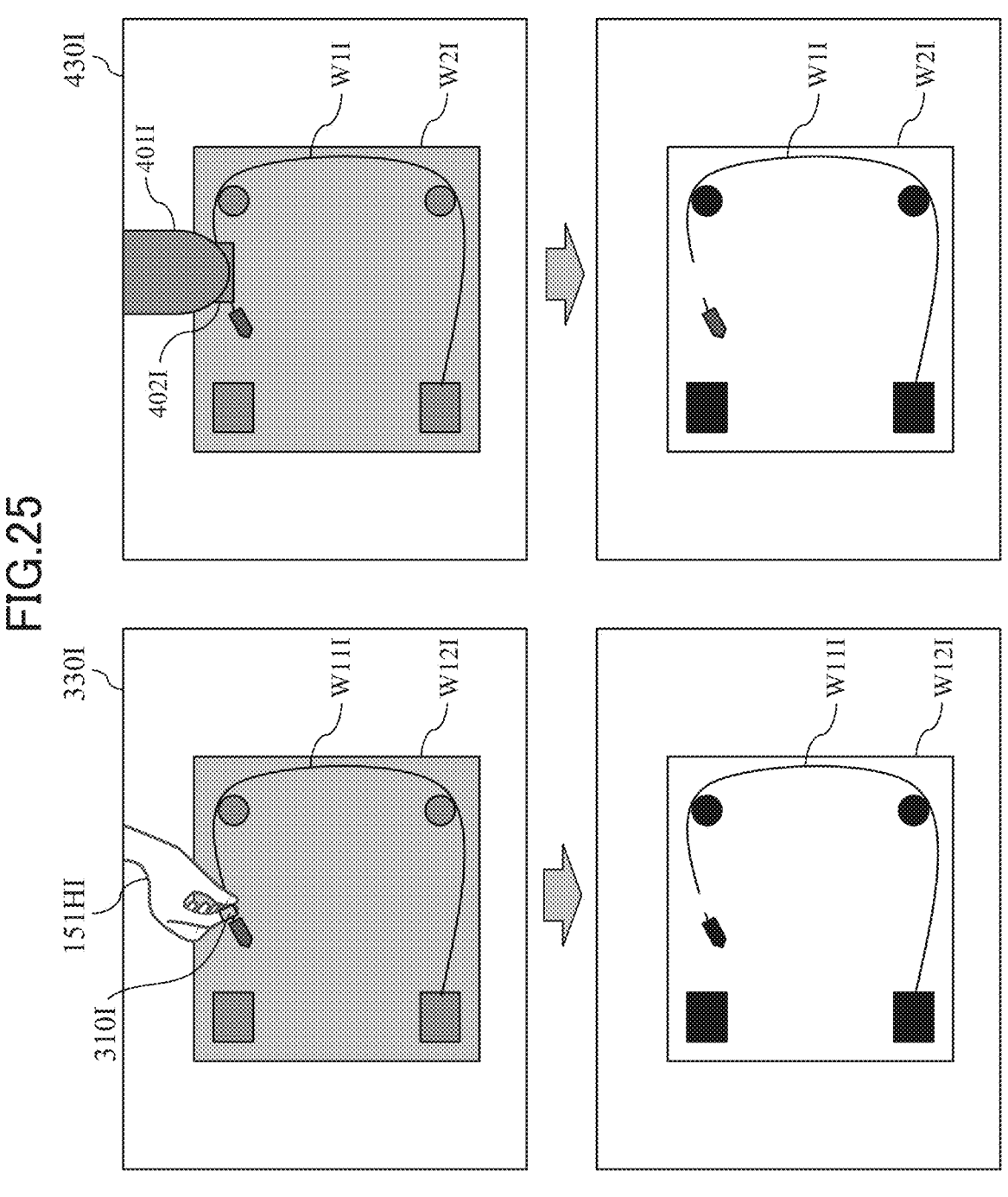
FIG. 25 is an explanatory diagram of a ninth modification example of the embodiment.

FIG. 25 is an explanatory diagram illustrating an image of a ninth modification example of the embodiment. As illustrated in FIG. 25, a configuration in which feature values such as color information about the workpiece is extracted by image processing and only the workpiece information is obtained may be employed. That is, the learning portion 601 may obtain the workpiece information D13 by extracting a feature of a portion corresponding to the workpiece W11 in the captured image 330I, that is, the workpiece image W11I. Similarly, the learning portion 601 may obtain the workpiece information D23 by extracting a feature of a portion corresponding to the workpiece W1 in the captured image 430I, that is, the workpiece image W1I. As a result of this, the difference between the two captured images 330I and 430I can be reduced.

To be noted, the camera 330 may be omitted, and the workpiece information D13 may be obtained from the captured image 320I obtained from the camera 320. In this case, the learning portion 601 may obtain the workpiece information D13 by extracting a feature of a portion corresponding to the workpiece W11 in the captured image 320I, that is, the workpiece image W11I.

FIG. 26 is a flowchart for obtaining a learned model of a tenth modification example of the embodiment. To be noted, steps of FIG. 26 different from the flowchart of FIG. 8 will be described below. In the flowchart of the tenth modification example illustrated in FIG. 26, steps S110 and S111 are added to the flowchart of FIG. 8. As illustrated in FIG. 26, in step S111, the information processing portion 600 selects data from the teacher data D0 including the time-series data $D1_1$ to $D1_N$ corresponding to the predetermined number N times of work, and uses the selected data as new teacher data D0' to improve the success rate of the work by the robot 400. Specifically, the information processing portion 600 operates the robot 400 on the basis of the information of the position information D11 and the force information D12 of the time-series data D1 included in the teacher data D0, selects a plurality of pieces of time-series data D1 for which the work has been successfully performed, and uses the selected time-series data D1 as the new teacher data D0'.

Detailed description will be given below. According to FIG. 26, when the number of times of the assembly work has reached the predetermined number N in step S105, that is, in the case where the result of step S105 is YES, the information processing portion 600 proceeds to step S110, and causes the robot 400 to perform work on the basis of the position information D11 and the force information D12 for all the time-series data D1 included in the teacher data D0. After step S110 is executed, in step S111, the information processing portion 600 executes the processing of generating the new teacher data D0' by selecting the plurality of pieces of time-series data D1 for which the work has been successfully performed. Then, in step S106, the information processing portion 600 performs learning by using the new teacher data D0'.

In this manner, the possibility of failure of the work caused by a small difference or deviation in structure between the tool 310 used by the worker 151 and the robot hand 402 included in the robot 400 can be reduced, and the success rate of the work by the robot 400 in the inference phase can be further improved.

Figure 27:
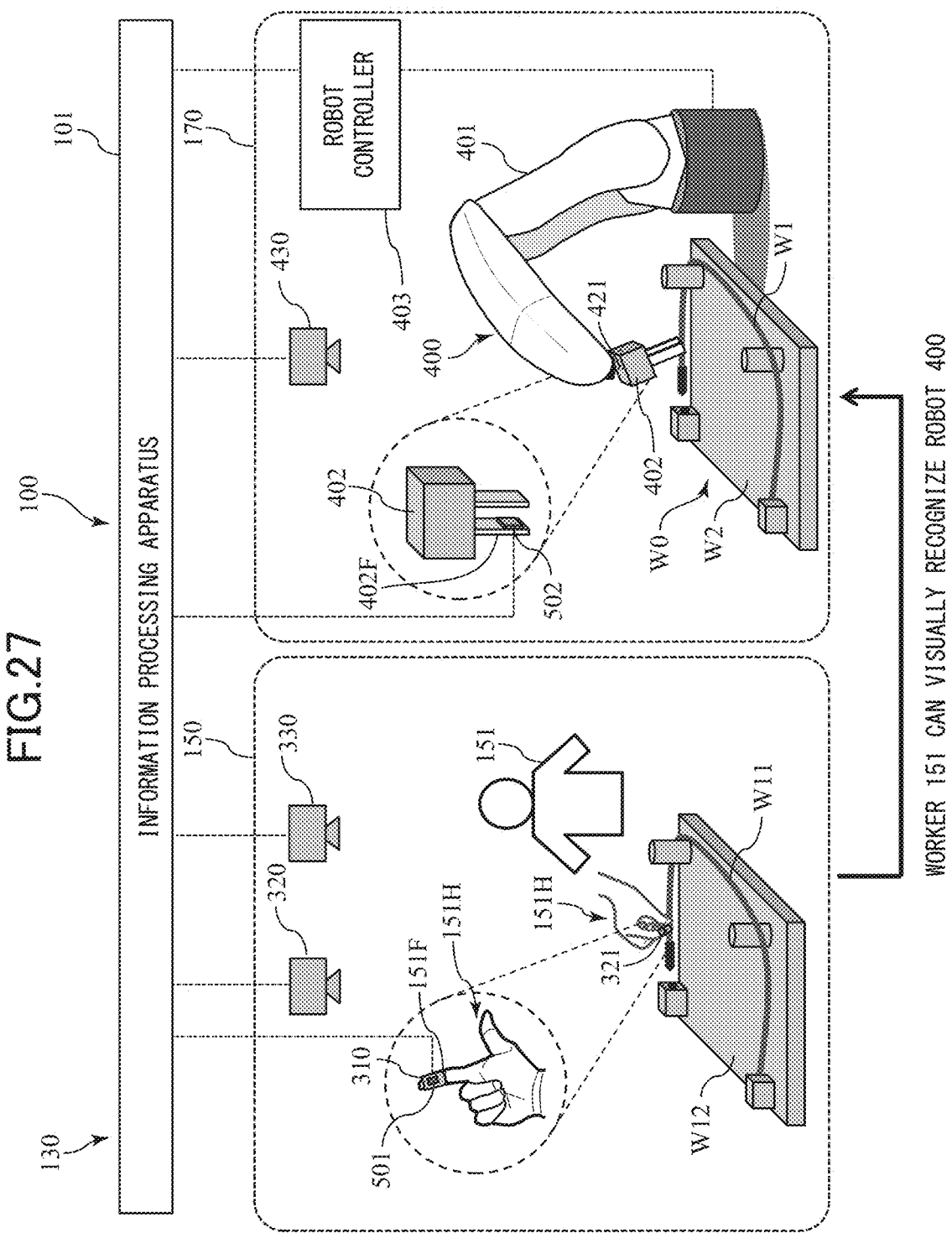
FIG. 27 is a diagram for describing an eleventh modification example of the embodiment.

FIG. 27 is a diagram for describing an eleventh modification example of the embodiment. In the eleventh modification example, a state in which the worker 151 can visually recognize the robot 400 will be described as an example. In the tenth modification example, in the flowchart illustrated in FIG. 26, the robot 400 is caused to perform the work in accordance with generated data to perform data selection in step S111, and data for which the work has been successfully performed is used as the new teacher data. In the eleventh modification example, the teaching work by the worker 151 and the assembly work by the robot 400 are performed in parallel. Here, the teaching work is the assembly work using the workpieces W11 and W12.

For example, in the case where the teaching work by the worker 151 has been performed a predetermined number of times, the information processing portion 600 causes the robot 400 to perform the assembly work by using the workpieces W1 and W2 on the basis of the data obtained hitherto. While the robot 400 is performing the assembly work, the worker 151 performs the teaching work in steps S100 to S105 of FIG. 26 again. Since the positional relationship $V_{r,t}$ between the origin 420 of the robot 400 and the portion 421 of the robot hand 402 is revealed by using the coordinate conversion described above, the robot 400 can be operated on the basis of this information of the positional relationship. Then, the data is selected on the basis of whether or not the work performed by the robot 400 has been successful. As a result of this, the teaching work by the worker 151 and the assembly work by the robot 400 can be performed in parallel. To be noted, in the case where the assembly work by the robot 400 is successful, the workpiece W2 coupled to the workpiece W1 may be detached and used again, or a workpiece set different from this workpiece set may be used.

In addition, the information processing portion 600 may be caused to execute the data selection processing by the worker 151 visually checking the assembly work performed by the robot 400. For example, the information processing portion 600 may be caused to execute the data selection processing by the worker 151 checking whether or not the workpieces W1 and W2 have been successfully assembled. In addition, the information processing portion 600 may be caused to execute the data selection processing by the worker 151 checking whether or not the work by the robot 400 is within the movable range. As a result of this, the teaching work by the worker 151 and the data selection processing can be performed efficiently.

As described above, the work precision can be improved by executing the processing of any one of the seventh to eleventh modification examples.

The present disclosure is not limited to the embodiment described above, and the embodiment can be modified in many ways within the technical concept of the present disclosure. In addition, the effects described in the present embodiment are merely enumeration of the most preferable effects that can be obtained from the embodiment of the present disclosure, and the effects of the embodiment of the present disclosure are not limited to those described in the present embodiment. In addition, two or more of the embodiment described above and various modification examples thereof may be implemented in combination.

Although a case where the robot arm 401 is a vertically articulated robot arm has been described in the embodiment described above, the configuration is not limited to this. The robot arm 401 may be, for example, a horizontally articulated robot arm, a parallel link robot arm, or an orthogonal robot.

In addition, the mechanism for holding the workpiece may be realized by a machine capable of automatically performing extension, contraction, bending, vertical movement, horizontal movement, turning, or a combination of these on the basis of information in a storage device provided in a control apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-168949, filed on Oct. 21, 2022, and Japanese Patent Application No. 2023-143833, filed on Sep. 5, 2023, which are hereby incorporated by reference herein in their entirety.

What is claimed is:

1. A robot system comprising:
a robot; and
an information processing portion,
wherein the information processing portion is configured to:
obtain a learned model by machine learning first force information about a force applied by a worker to a first workpiece for coupling the first workpiece to a second workpiece, first position information about a position of a first portion that is moved by the worker while holding the first workpiece to couple the first workpiece to the second workpiece, and first workpiece information about a state of the first workpiece and state of the second workpiece, and
control the robot on a basis of output data of the learned model, and
wherein the first workpiece information is an image in which the first workpiece, the second workpiece, and the first portion are captured, and in which at least part of the captured first portion is omitted.

2. The robot system according to claim 1, wherein the information processing portion is configured to synchronously obtain the first force information, the first position information, and the first workpiece information in time series.

3. The robot system according to claim 1,
wherein the workpiece is held by a tool worn by the worker, and
wherein the first force information is obtained by the tool, and is related to a force of operating the workpiece in a case where the worker holds the workpiece by the tool.

4. The robot system according to claim 3, wherein the first position information is information of a position related to the worker or the tool.

5. The robot system according to claim 3, further comprising:
a first force sensor disposed at the tool,
wherein the information processing portion is configured to obtain the first force information from the first force sensor.

6. The robot system according to claim 3, wherein the tool includes a wearable tool that is wearable on a finger of the worker.

7. The robot system according to claim 3, wherein the tool includes a hand mechanism that the worker is capable of operating.

8. The robot system according to claim 1, further comprising:

a first image pickup apparatus, wherein the information processing portion is configured to obtain the first position information on a basis of a first image obtained from the first image pickup apparatus.

9. The robot system according to claim 8, further comprising:

a second image pickup apparatus, wherein the information processing portion is configured to obtain the first workpiece information on a basis of a second image obtained from the second image pickup apparatus.

10. The robot system according to claim 1, wherein the workpiece is held by a tool worn by the worker, and wherein the information processing portion is configured to obtain the first workpiece information by masking at least part of the first portion of the image.

11. The robot system according to claim 1, wherein the information processing portion is configured to obtain the first workpiece information by simplifying at least part of the first portion of the image.

12. The robot system according to claim 1, wherein the information processing portion is configured to obtain the first workpiece information by extracting a feature of a portion of the image corresponding to the first workpiece.

13. The robot system according to claim 1, wherein the first portion includes a marker.

14. The robot system according to claim 1, wherein the information processing portion is configured to issue a warning in a case where a posture of the robot based on the first position information is a singular point in control of the robot.

15. The robot system according to claim 14, wherein the information processing portion is configured to cause a display portion to display an image indicating the warning.

16. The robot system according to claim 1, wherein the information processing portion is configured to cause a display portion to display a robot image corresponding to the robot in a posture based on the first position information.

17. The robot system according to claim 1, wherein the robot includes a robot hand, and wherein the information processing portion is configured to obtain, as input data for the learned model, second force information about a force applied to the robot hand for coupling the first workpiece to the second workpiece by the robot hand, second position information about a position of a second portion included in the robot hand, and second workpiece information about a state of the first workpiece and state of the second workpiece.

18. The robot system according to claim 17, wherein the robot includes a second force sensor disposed in the robot hand, and wherein the information processing portion is configured to obtain the second force information from the second force sensor.

19. The robot system according to claim 1, wherein the first workpiece is a wire, the second workpiece is a base member, and the first workpiece information includes information about deformation of the wire that changes in time series in accordance with an operation by the worker.

20. The robot system according to claim 1 wherein the first force information includes information about a force that the worker consciously or unconsciously applies to the workpiece in a case where the worker operates the workpiece.

21. The robot system according to claim 1, wherein the robot is capable of operating in parallel with operation of the workpiece by the worker.

22. The robot system according to claim 1, wherein the information processing portion is configured to obtain the learned model by selectively learning data with which the robot has been controlled to successfully perform a work.

23. A method for manufacturing a product, the method comprising manufacturing the product by the robot system according to claim 1.

24. The robot system according to claim 1, wherein the image is one of a plurality of images captured successively in time series, and wherein the first workpiece information includes the plurality of images, thereby indicating a state in which the first workpiece is deformed on the second workpiece.

25. The robot system according to claim 1, wherein the first position information, in which the robot is outside a movable range, is not used for the machine learning.

26. The robot system according to claim 1, wherein, while the worker is manipulating the first workpiece, when the robot is located at a position visible to the worker, the information processing portion is configured to allow the worker to select, while visually checking a state of the robot, the first force information, the first position information, and the first workpiece information for use in the machine learning.

27. A learning apparatus comprising a learning portion configured to obtain a learned model by machine learning first force information about a force applied by a worker to a first workpiece for coupling the first workpiece to a second workpiece, first position information about a position of a first portion of the worker while holding the first workpiece to couple the first workpiece to the second workpiece, and first workpiece information about a state of the first workpiece and state of the second workpiece, wherein the first workpiece information is an image in which the first workpiece, the second workpiece, and the first portion are captured, and in which at least part of the captured first portion is omitted.

28. An information processing apparatus comprising an information processing portion configured to obtain a learned model by machine learning first force information about a force applied by a worker to a first workpiece for coupling the first workpiece to a second workpiece, first position information about a position of a first portion of the worker while holding the first workpiece to couple the first workpiece to the second workpiece, and first workpiece information about a state of the first workpiece and state of the second workpiece, wherein the first workpiece information is an image in which the first workpiece, the second workpiece, and the first portion are captured, and in which at least part of the captured first portion is omitted.

29. A learned model obtained by machine learning based on first force information about a force applied by a worker to a first workpiece for coupling the first workpiece to a second workpiece, first position information about a position of a first portion of the worker while holding the first workpiece to couple the first workpiece to the second workpiece, and first workpiece information about a state of the first workpiece and state of the second workpiece, wherein the first workpiece information is an image in which the first workpiece, the second workpiece, and the first portion are captured, and in which at least part of the captured first portion is omitted.

30. A control method comprising:

obtaining a learned model by machine learning first force information about a force applied by a worker to a first workpiece for coupling the first workpiece to a second workpiece, first position information about a position of a first portion of the worker, and first workpiece information about a state of the first workpiece and state of the second workpiece; and controlling a robot on a basis of output data of the learned model, wherein the first workpiece information is an image in which the first workpiece, the second workpiece, and the first portion are captured, and in which at least part of the captured first portion is omitted.

31. An information processing method comprising obtaining a learned model by machine learning first force information about a force applied by a worker to a first workpiece for coupling the first workpiece to a second workpiece, first position information about a position of a first portion of the worker while holding the first workpiece to couple the first workpiece to the second workpiece, and first workpiece information about a state of the first workpiece and state of the second workpiece, wherein the first workpiece information is an image in which the first workpiece, the second workpiece, and the first portion are captured, and in which at least part of the captured first portion is omitted.

32. A non-transitory computer-readable recording medium storing a program for causing a computer to execute the information processing method according to claim 31.

* * * * *